United States Patent
DeRuyter et al.

(10) Patent No.: US 8,297,910 B2
(45) Date of Patent: Oct. 30, 2012

(54) FLUID TURBINE SYSTEMS

(75) Inventors: William DeRuyter, Norco, CA (US);
Michael Allawos, Glendora, CA (US);
Peter L. Coye, Claremont, CA (US)

(73) Assignee: California Energy & Power, Glendora, CA (US)

( * ) Notice: Subject to any disclaimer, the term of this patent is extended or adjusted under 35 U.S.C. 154(b) by 0 days.

(21) Appl. No.: 12/798,717

(22) Filed: Apr. 9, 2010

(65) Prior Publication Data

US 2010/0196153 A1    Aug. 5, 2010

Related U.S. Application Data

(63) Continuation of application No. 12/268,274, filed on Nov. 10, 2008, now Pat. No. 7,744,338.

(60) Provisional application No. 61/094,386, filed on Sep. 4, 2008.

(51) Int. Cl.
*F03D 7/06* (2006.01)
(52) U.S. Cl. ........................................... 415/2.1
(58) Field of Classification Search ................ 416/9, 10, 416/11, 12, 13, 14, 15, 16, 17, 210 R; 415/2.1, 415/3.1, 4.1, 4.2, 4.4
See application file for complete search history.

(56) References Cited

U.S. PATENT DOCUMENTS

| | | | |
|---|---|---|---|
| 600,893 A | | 3/1898 | Schmucker |
| 698,409 A | * | 4/1902 | Neuser ............................ 415/2.1 |
| 767,080 A | | 8/1904 | Phillips |
| 1,697,574 A | | 1/1929 | Savonius |
| 1,766,765 A | | 6/1930 | Savonius |
| 1,808,874 A | | 6/1931 | Wilson |
| 1,810,113 A | | 6/1931 | Schlotzhauer |
| 2,169,149 A | | 8/1939 | Johanson |
| 2,335,817 A | | 11/1943 | Topalov |
| 3,895,882 A | | 7/1975 | Moyer |
| 3,918,839 A | | 11/1975 | Blackwell et al. |
| 3,970,409 A | | 7/1976 | Luchuk |

(Continued)

FOREIGN PATENT DOCUMENTS

DE        3723890 A   *   2/1989

(Continued)

OTHER PUBLICATIONS

DE 3723890 A EPO Machine Translation. Accessed EPO website Jun. 14, 2011.*

(Continued)

*Primary Examiner* — Richard Edgar
(74) *Attorney, Agent, or Firm* — Knobbe, Martens, Olson & Bear, LLP

(57) ABSTRACT

Various fluid turbine systems and methods are described. The turbine can be a vertical axis wind turbine configured to generate power from wind energy. The turbine system can have a blade assembly. The blade assembly can have a plurality of blades rotatable about an axis. The turbine system can have a concentrator positionable upwind and in front of a return side of the blade assembly. The concentrator can define a convex surface facing the wind. The turbine system can also have a variable concentrator positionable upwind of a push side of the blade assembly. The variable concentrator can be adjustable between a first position and a second position, the variable concentrator being capable of deflecting more wind toward the turbine in the first position than in the second position.

8 Claims, 17 Drawing Sheets

U.S. PATENT DOCUMENTS

| | | | |
|---|---|---|---|
| 3,995,170 | A | 11/1976 | Graybill |
| 4,031,405 | A | 6/1977 | Asperger |
| 4,079,264 | A | 3/1978 | Cohen |
| 4,115,032 | A | 9/1978 | Lange |
| 4,264,279 | A | 4/1981 | Dereng |
| 4,281,965 | A | 8/1981 | Stjernholm |
| 4,288,200 | A | 9/1981 | O'Hare |
| 4,293,274 | A | 10/1981 | Gilman |
| 4,359,311 | A | 11/1982 | Benesh |
| 4,382,191 | A | 5/1983 | Potter |
| 4,486,143 | A | 12/1984 | McVey |
| 4,543,042 | A | 9/1985 | Lange |
| 4,718,821 | A | 1/1988 | Clancy |
| 4,890,976 | A | 1/1990 | Jansson |
| 5,037,268 | A | 8/1991 | Fenlon |
| 5,391,926 | A | 2/1995 | Staley et al. |
| 5,503,530 | A | 4/1996 | Walters |
| 6,158,953 | A | 12/2000 | Lamont |
| 6,428,275 | B1 | 8/2002 | Jaakkola |
| 6,518,680 | B2 | 2/2003 | McDavid, Jr. |
| 6,666,650 | B1 | 12/2003 | Themel |
| 6,674,181 | B2 | 1/2004 | Harbison |
| 6,779,966 | B2 | 8/2004 | Smith, II |
| 6,911,745 | B1 | 6/2005 | Howenstine et al. |
| 6,966,747 | B2 * | 11/2005 | Taylor et al. ............... 415/1 |
| 6,984,899 | B1 | 1/2006 | Rice |
| 7,040,859 | B2 | 5/2006 | Kane |
| 7,084,523 | B2 | 8/2006 | Noguchi |
| 7,132,760 | B2 | 11/2006 | Becker |
| 7,144,214 | B2 | 12/2006 | Kinpara et al. |
| 7,241,105 | B1 | 7/2007 | Vanderhye et al. |
| 7,287,954 | B2 | 10/2007 | Kinkaid et al. |
| 7,314,346 | B2 | 1/2008 | Vanderhye et al. |
| 7,323,792 | B2 | 1/2008 | Sohn |
| 7,344,353 | B2 | 3/2008 | Naskali et al. |
| 7,347,660 | B2 | 3/2008 | Taylor et al. |
| 7,364,399 | B2 | 4/2008 | Stiig et al. |
| 7,364,406 | B2 | 4/2008 | Kinkaid |
| 2004/0036297 | A1 | 2/2004 | John |
| 2004/0057829 | A1 | 3/2004 | Khan |
| 2004/0061337 | A1 | 4/2004 | Becker |
| 2004/0105754 | A1 | 6/2004 | Takahashi |
| 2005/0099013 | A1 | 5/2005 | Noguchi |
| 2006/0257240 | A1 | 11/2006 | Naskali et al. |
| 2006/0275105 | A1 | 12/2006 | Roberts |
| 2007/0269305 | A1 | 11/2007 | Burg |
| 2008/0085179 | A1 | 4/2008 | Kinkaid et al. |
| 2008/0187432 | A1 | 8/2008 | Cowan |

FOREIGN PATENT DOCUMENTS

| | | | |
|---|---|---|---|
| GB | 2296048 A | * | 6/1996 |
| JP | 2005-113896 A | | 4/2005 |
| JP | 2007154864 A | * | 6/2007 |
| WO | WO 8706652 | | 11/1987 |
| WO | WO 8706652 A1 | * | 11/1987 |

OTHER PUBLICATIONS

PCT International Search Report, Application No. PCT/US2009/053934; dated Mar. 29, 2010.

* cited by examiner

FLUID TURBINE SYSTEMS

CROSS-REFERENCE TO RELATED APPLICATIONS

This application a continuation of U.S. patent application Ser. No. 12/268,274, filed Nov. 10, 2008, now U.S. Pat. No. 7,744,338, which is related to and claims the benefit of U.S. Provisional Application No. 61/094,386, filed Sep. 4, 2008, the entire disclosures of which are hereby incorporated by reference herein.

BACKGROUND OF THE INVENTIONS

1. Field of the Invention

This application relates to fluid turbines, and more particularly relates to vertical axis fluid turbines.

2. Description of the Related Art

Turbines have been used to generate power from moving fluids, such as water or air. However, known units and various components thereof have various well known limitations and disadvantages.

SUMMARY OF THE INVENTIONS

Example embodiments described herein have several features, no single one of which is indispensible or solely responsible for their desirable attributes. Without limiting the scope of the claims, some of the advantageous features will now be summarized.

In some embodiments, a fluid turbine system comprises a turbine, a concentrator, and a variable concentrator. The turbine comprises a blade assembly, the blade assembly comprising a plurality of blades rotatable about an axis. One or more of the blades defines an open section positioned such that a portion of the open section is closer to the axis than an outside edge of the blade. The turbine also comprises a push half and a return half for a given direction of an overall flow of a fluid that defines an upstream direction and a downstream direction. The concentrator is positionable in a concentrator position directly upstream of at least a portion of the return half of the turbine. In the concentrator position, the concentrator defines a convex surface facing upstream and a concave surface facing downstream. The convex surface is positionable to deflect at least some fluid toward the push half of the turbine and the concave surface is positionable to redirect at least some fluid flowing generally upstream from the return half of the turbine to flow generally downstream. The variable concentrator is positionable upstream of the turbine and closer to the push half than the return half. The variable concentrator comprises a deflection surface operable to deflect fluid, and the deflection surface is positionable to extend generally parallel to the axis along a substantial portion of a height of the turbine. The variable concentrator is moveable between a first position and a second position, and the variable concentrator is configured to deflect more fluid toward the blade assembly in the first position than in the second position.

In some embodiments, a fluid turbine system comprises a turbine and a concentrator. The turbine comprises blades rotatable about an axis, and the blades define a window along a substantial portion of a height of the blades. A first plane parallel with and intersecting the axis divides the space surrounding the turbine into a return side and a push side opposite the return side, and the turbine is configured to rotate generally in an upstream direction on the return side and generally in a downstream direction on the push side relative to a fluid flowing nominally parallel to the plane. The concentrator is positionable upstream of at least a portion of the turbine and at least partially or completely on the return side. The concentrator comprises a first curved surface portion configured to extend from a first position upstream of the turbine to a second position further upstream of the turbine and further into the return side. The first curved surface portion is configured to be convex facing an upstream direction of the fluid flow and is positionable to deflect at least some fluid toward the push side. The concentrator is also positionable to create a relative vacuum to draw at least some fluid away from the window of the blades.

In some embodiments, a fluid turbine system comprises a turbine and a concentrator. The turbine is rotatable about an axis, and a plane parallel with and intersecting the axis divides the space surrounding the turbine into a return side and a push side opposite the return side. The turbine is configured to rotate generally in an upstream direction on the return side and generally in a downstream direction on the push side relative to a fluid flowing nominally parallel to the plane. The turbine has a return outer edge furthest away from the push side. The concentrator is positionable upstream of at least a portion of the turbine and at least partially or completely on the return side. The concentrator comprises a generally u-shaped section, and the generally u-shaped section comprises an upstream surface portion positionable to be convex facing upstream and a downstream surface portion positionable to be concave facing downstream. The upstream surface portion is positionable to direct a push portion of fluid toward the push side and to direct a return portion of fluid downstream away from the turbine. The downstream surface portion forms a partially enclosed area shaped and positionable to receive a drag portion of fluid from the turbine and redirect the drag portion of fluid downstream into the return portion of fluid. The concentrator has a return end configured to be furthest away from the push side. The return end is positionable such that the closest distance between the return end of the concentrator and the plane is at least 1.2 times greater than the closest distance between the return outer edge of the turbine and the plane.

In some embodiments, a fluid turbine system comprises a turbine and a variable concentrator. The turbine is rotatable about an axis. A first plane parallel with and intersecting the axis divides the space surrounding the turbine into a return side and a push side opposite the return side. The turbine is configured to rotate generally in an upstream direction on the return side and generally in a downstream direction on the push side relative to a fluid flowing nominally parallel to the plane. The turbine also defines a sweep path. The variable concentrator is positionable on the push side and upstream of the entire sweep path of the turbine. The variable concentrator comprises a deflection surface positionable to extend generally parallel to the axis along a substantial portion of a height of the turbine. The deflection surface is adapted to deflect at least some fluid. The variable concentrator is moveable between a first position and a second position, and the deflection surface is configured to deflect less fluid toward the turbine in the second position than in the first position.

In some embodiments, a fluid turbine comprises a plurality of blades rotatable about an axis. One or more of the blades defines an open section positioned such that a portion of the open section is closer to the axis than an outside edge of the blade. The turbine comprises a push half and a return half for a given direction of an overall flow of a fluid that defines an upstream direction and a downstream direction. One or more of the plurality of blades is a push blade, the push blade defining the open section and comprising a tip. The push blade is positionable in a push position in which the tip of the push blade is located on the push half. The push blade further comprises a push surface portion facing generally upstream when the push blade is in the push position. One or more of the plurality of blades is a catch blade, the catch blade comprising a tip. The catch blade is positionable in a catch position in which the tip of the catch blade is located generally downstream of the axis. The catch blade further comprises a catch surface portion facing generally upstream when the catch blade is in the catch position. The turbine is positionable in a torque position wherein an upstream blade is a push blade in the push position and a downstream blade is a catch blade in the catch position. The torque position is defined by the downstream blade being located generally downstream of the upstream blade and the catch surface portion of the downstream blade being located directly downstream from the open section of the upstream blade.

The disclosure also includes methods of using and methods of manufacture of the systems and/or various components or combinations of components described above or elsewhere herein.

BRIEF DESCRIPTION OF THE DRAWINGS

The patent or application filed contains at least one drawing executed in color. Copies of this patent or patent application publication with color drawings will be provided by the Office upon request and payment of the necessary fee.

These and other features, aspects and advantages of the inventions will be better understood with reference to embodiments illustrated in the accompanying drawings. The illustrated embodiments are not intended to define the limits or scope of the inventions.

DETAILED DESCRIPTION OF THE PREFERRED EMBODIMENTS

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved, by any particular embodiment. Thus, for example, various embodiments may be carried out in a manner that achieves or optimizes one advantage or group of advantages as taught herein without necessarily achieving other aspects or advantages as may also be taught or suggested herein.

Figure 1:
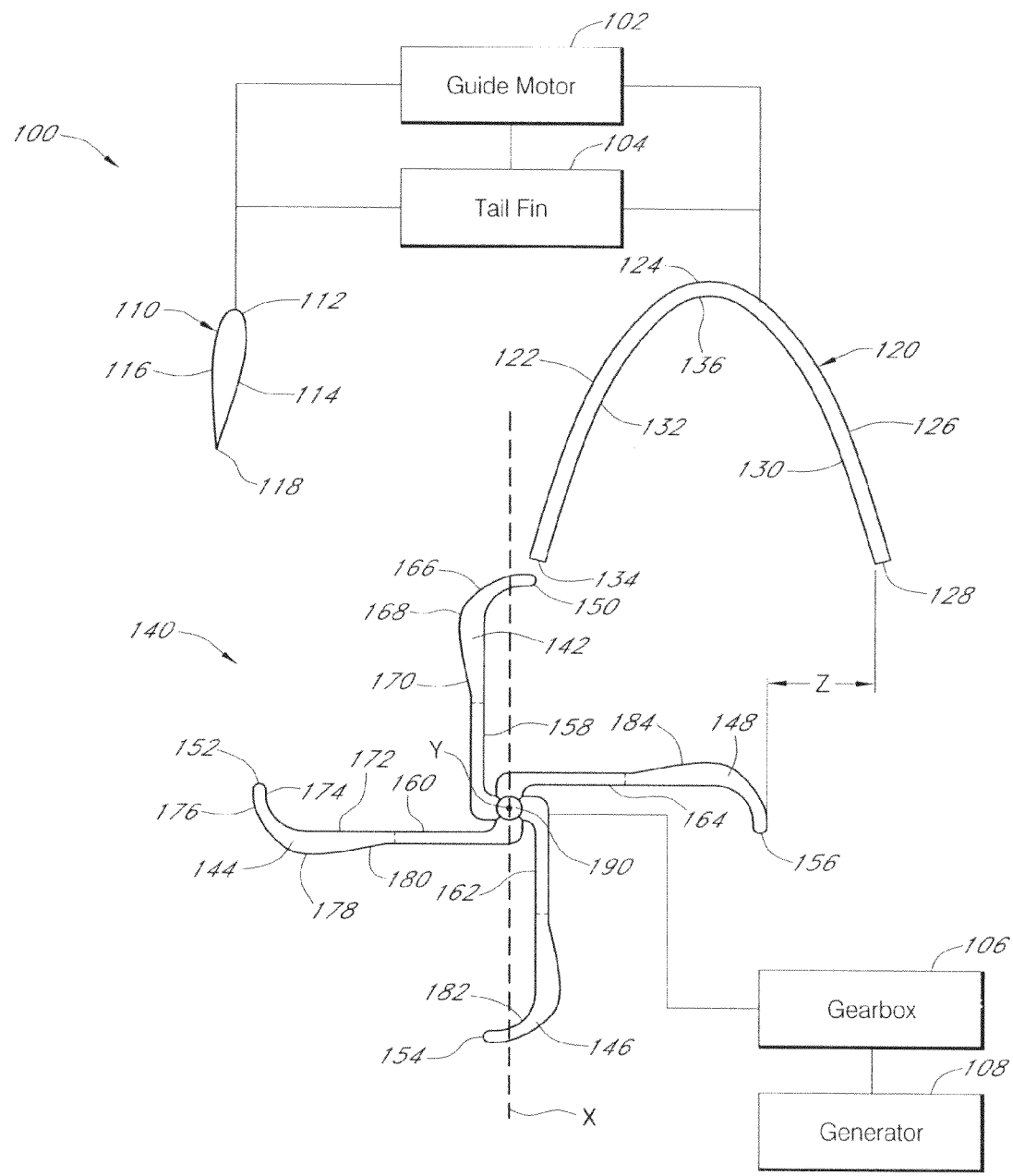
FIG. 1 is a schematic illustrating an embodiment of a fluid turbine system.

FIG. 1 is a schematic view illustrating an embodiment of a fluid turbine system 100. The turbine system 100 can include a blade assembly 140, a concentrator 120, a variable concentrator 110, a guide motor 102, a tail fin 104, a gearbox 106, and a generator 108. In the embodiment illustrated in FIG. 1, the blade assembly 140, concentrator 120, and variable concentrator 110, are positioned according to one possible configuration of the turbine system. A hypothetical overall fluid flow from the top of FIG. 1 to the bottom of FIG. 1 defines an "upstream" and a "downstream" direction. The concentrator 120 and variable concentrator 110 are located upstream of the blade assembly 140 as shown in FIG. 1. The overall fluid flow direction is for ease of description and aids in defining the structure of the turbine system. One of skill in the art recognizes that an actual fluid may not flow consistently and uniformly in a single direction.

The blade assembly 140 can comprise a plurality of blades. As illustrated in FIG. 1, four blades 142, 144, 146, 148 are rotatable about an axis Y corresponding to a center axis of a central shaft 190. The overall fluid flow direction also defines a blade rotation direction. The blade assembly 140 shown in FIG. 1 will tend to rotate counterclockwise in response to a fluid flowing in the overall fluid flow direction. As illustrated in the top view of the blade assembly 140 shown in FIG. 1, each of the four blades can have an identical cross-section. Each blade has a tip 150, 152, 154, 156. The blade tips 150, 152, 154, 156 define a radius that the blade tip is located from the axis Y, which can be called the blade tip radius. Each blade 142, 144, 146, 148 has a front side and a back side, on either side of tip 150, 152, 154, 156. Most of the front side of blades 142, 144, 146, 148 will face away from the blade rotation direction, and most of the back side will face toward the blade rotation direction.

The cross section of each blade shown in FIG. 1 has a substantially straight section 158, 160, 162, 164 extending along a tangent of the central shaft 190. The straight sections 158, 160, 162, 164 of the blades can include an open section or windows extending along a height of the blades (shown in broken lines in FIG. 1, see also FIG. 9). In some embodiments, the open sections of the blades extends along a substantial portion of a height of the blades. The blades need not include substantially straight sections. Especially in embodiments where the substantially straight section of a cross-section of the blade corresponds to the open section of the blade, the geometry of the blade support may have little effect on the movement of fluid around the blade. However, for ease of manufacturing and conservation of material, the blade supports along an open section can be substantially straight. The open sections can be continuous or discontinuous along the height of the blades. In some embodiments, each blade has an open section. The open section can be positioned such that a portion of the open section is closer to the axis Y than an outside edge of the blade. In some embodiments, approximately an inner radial half of the blade assembly is substantially open such that the blades have little or no surface area exposed to fluid within approximately an inner radial half of the blade assembly. The open area may be smaller or larger depending on desired torque and drag characteristics. Open sections closer to the axis than an outside edge of the blades can allow fluid to impart an impulse on the portion of the blade that provides the most torque (i.e., further from the axis) and reduce drag created by fluid located near the axis of rotation.

For purposes of discussion, a plane X is shown in FIG. 1 as a line. Plane X is parallel with and intersecting the axis Y about which the blades are rotatable, and parallel with the overall fluid flow. Plane X divides the space surrounding the turbine assembly generally into two halves: the push side and the return side. Blade 144 is on the push side because a fluid flowing in the direction of overall fluid flow as defined above tends to rotate the blade assembly such that blade 144 is pushed by fluid and rotates in a downstream direction from the position shown in FIG. 1. Blade 148 is on the return side because blade 148 will tend to rotate upstream to return back to the push side in response to a hypothetical overall fluid flow defined above for FIG. 1. The turbine itself can also have two halves: a push half and a return half. For a given direction of an overall flow of a fluid that defines an upstream direction and a downstream direction, the push half of the turbine tends to rotate upstream and the return half of the turbine tends to rotate downstream.

With further reference to FIG. 1, a number of blade positions can be defined in order to facilitate description of the geometry of blades 142, 144, 146, 148 as well as their operation. Blade 142 can be considered to be in a lift position. The lift position is characterized by a blade positioned such that a tip of the blade is located generally upstream of the axis Y and a curved surface portion of the blade is convex facing away from the return side. The tip 150 of blade 142 as illustrated in FIG. 1 is located upstream of the axis Y and a curved surface portion 166 is convex facing away from the return side. Blade 144 can be considered to be in a push position. The push position can be characterized by a blade position such that the tip of the blade is located on the push side and a push surface portion of the blade faces generally upstream. Blade 144 has a tip 152 on the push side and a push surface portion 172 facing generally upstream. Blade 146 can be considered to be in a catch position. The catch position can be characterized by a blade positioned such that the tip of the blade is located generally downstream of the axis Y and a catch surface portion of the blade faces generally upstream. A tip 154 of blade 146 is located generally downstream of the axis Y and a catch surface portion 182 of blade 146 is facing generally upstream as illustrated in FIG. 1. Blade 148 can be considered to be in a return position. The return position can be characterized by a tip located on the return side and a return surface portion of the blade facing generally upstream. As illustrated in FIG. 1, blade 148 has a tip 156 located on the return side and a return surface portion 184 facing generally upstream.

Based on the position of the blades as illustrated in FIG. 1, blade 142 can be called a lift blade, blade 144 can be a called push blade, blade 146 can be called a catch blade, and blade 148 can be called a return blade. As the blade assembly 140 tends to rotate in a counterclockwise direction, blade 142 will transition into a push position, blade 144 will transition into a catch position, blade 146 will transition into a return position, and blade 148 will transition into a lift position. These positions are used for description purposes, and each blade can be considered to be in more than one position at any given point in the rotation of a given blade assembly. Each blade can also exhibit characteristics of one or more of a lift blade, a push blade, a catch blade, or a return blade at one or more points in its rotation about the axis Y, including simultaneously exhibiting two or more characteristics of such blades.

As discussed above, blade 142 is in the lift position. Blade 142 is positioned and shaped to provide lift when acted on by a fluid, thereby providing torque to rotate the blade assembly 140. The curved surface portion 168 of blade 142 as illustrated in FIG. 1 extends from a first end 166 near the tip 150 of blade 142 to a second end 170 near the generally straight section 158 or open section of blade 142.

Blade 144 is in the push position, with push surface portion 172 facing generally upstream. As illustrated in FIG. 1, push surface portion 172 can be generally straight and located on a front surface of blade 144. The front surface of blade 144 can also include a curved portion 174 located further from the central shaft 190 radially from the push surface portion 172. As illustrated in the position of blade 144 shown in FIG. 1, the curved portion 174 is located further upstream than the push surface portion 172 when the push surface portion 172 is generally perpendicular to plane X. Blade 144 also includes a back surface portion 178 located opposite the curved portion 174 and the push surface portion 172. The back surface portion 178 extends from a first end 176 near the tip 152 of blade 144 to a second end 180 near the generally straight section 160 of blade 144. As illustrated in FIG. 1, blade 144 is in a horizontal position. The back surface portion 178 of blade 144 is convex facing downstream. The back surface portion is also shaped and configured such that a middle portion of the back surface portion 178 extends further downstream than the first end 176 and the second end 180 of the back surface portion 178 when blade 144 is in the horizontal position. Because the back surface portion is located on approximately an outer radial half of blade 144 in the embodiment illustrated in FIG. 1, the middle portion of the back surface portion 178 is also located outside of an inner radial half of blade 144. The middle surface portion of the back surface portion 178 can reduce drag and provide lift in various positions of the blade, and these features can be enhanced by the location of the middle surface portion near the tip of a blade. Additional, features of the blades 142, 144, 146, 148 of the blade assembly 140 are described below.

As illustrated in the schematic of FIG. 1, the blade assembly 140 can be connected to a gearbox 106 and/or a generator 108. In some embodiments, the gearbox 106 is used to convert the speed of rotation of the blade assembly 140. The generator 108 can be connected to the gearbox 106 or to the blade assembly 140 to convert rotational energy of the turbine system 100 into electrical power. The fluid turbine system 100 can be used without a gearbox 106 or a generator 108 to perform other functions or produce other forms of energy such as mechanical energy for use in driving a mechanical device.

The concentrator 120 illustrated in FIG. 1 will now be described. The concentrator 120 includes an upstream surface and a downstream surface. The concentrator can also include a push end 134 located closest to the push side or furthest from the return side and a return end 128 located furthest into the return side or furthest from the push side. In the embodiment shown in FIG. 1, the concentrator is shaped substantially as a front section of an airflow with a hollow or open downstream side. The upstream surface can include a first curved surface portion 122 extending from a first position upstream of at least a portion of the turbine to a second position further upstream and further into the return side. The first curved surface portion 122 of the upstream surface can be shaped to be convex facing generally upstream and positionable to deflect at least some fluid toward the push side of the turbine system.

In the embodiment illustrated in FIG. 1, the push end 134 of the concentrator 120 is located on the return side of plane X. In FIG. 1, the push end 134 is an end of the concentrator 120 closest to the push side but a gap remains between push end 134 and plane X. A gap between the push end 134 and plane X can increase efficiency, power, or minimum startup fluid speed of the system. For example, fluid flowing in a direction toward the push side from the concentrator 120 (e.g., from first curved surface portion 122) can begin to "push" blade 142 in the proper direction sooner than if the push end 134 of the concentrator were positioned closer to the push side or if no concentrator 120 were present. As blade 142 rotates counterclockwise from the position shown in FIG. 1, fluid flowing downstream and/or toward the push side from the concentrator 120 can impinge upon the front side of blade 142 sooner than the front side of blade 142 would otherwise be exposed to fluid approaching blade 142 in the direction of the overall fluid flow. In some embodiments, the gap or a shortest distance between the push end 134 of the concentrator 120 and plane X is greater than about one percent (1%) of the blade tip radius, greater than about three percent (3%) of the blade tip radius, or greater than about five percent (5%) of the blade tip radius. In some embodiments, the gap is between about six and seven percent of the blade tip radius. However, the push end 134 of concentrator 120 need not be located on the return side of plane X.

In some embodiments, the concentrator 120 is positioned such that at least a portion of the concentrator 120 is on the push side of the turbine system 100. The concentrator 120 can also intersect plane X when in this position. A gap can also exist between the push end 134 of the concentrator 120 and plane X such that the concentrator 120 at least partially blocks the blade assembly 140 on the push side. It can be desirable to position the concentrator 120 to at least partially block the blade assembly 140 on the push side in order to slow rotation of the blade assembly 140, stop rotation of the blade assembly 140, or protect the turbine system 100 from damage by fluid flowing at high speeds. In some embodiments, when the push end 134 of the concentrator 120 is on the push side, a blocking gap exists between the push ends 134 and plane X. The blocking gap can be greater than about one percent (1%) of the blade tip radius, greater than about three percent (3%) of the blade tip radius, or greater than about five percent (5%) of the blade tip radius. The blocking gap can be between about twenty-five percent and about fifty percent of the blade tip radius. In some embodiments the blocking gap is greater than about fifty percent of the blade tip radius. In some embodiments the blocking gap can be about 100 percent of the blade tip radius. In some embodiments, a center of the concentrator 120 is positionable to approximately intersect plane X.

In some embodiments, the concentrator 120 is moveable between a first position and a second position. The second position can correspond to a position in which the turbine system 100 is configured to extract less energy from the fluid or expose less of the blade assembly 140 to fluid approaching the turbine system 100 than in the first position. In some embodiments, when the concentrator 120 is in the first position, the push end 134 and the return end 128 of the concentrator 120 are on the return side of the turbine system 100. In some embodiments, when the concentrator 120 is in the second position, the push end 134 is on the push side and the return end 128 is on the return side. The concentrator 120 can also be positionable to fully block the blade assembly 140 from substantially any direct exposure to fluid approaching the turbine system 100. In some embodiments, the concentrator 120 is moveable along a track between the first and the second positions. A motor can be used to adjust the position of the concentrator 120. A sensor mounted on or near the fluid turbine system 100 can be used to sense a direction or speed of the fluid. Information from the sensor can be used to manually or automatically adjust the position of the concentrator 120. For example, a sensor mounted on the concentrator 120 can send a signal to a computer indicating a high fluid or wind speed. The computer can determine that the concentrator 120 should be moved to reduce the rotational speed of the blade assembly 140 or to protect the blade assembly 140 from damage. As wind speed decreases, the concentrator 120 can be automatically moved back toward the first position. The concentrator 120 can be a governor, which governs the rotational speed of the blade assembly 140. Movement of the concentrator 120 can be instead of, in addition to, or combined with adjustment of the concentrator with respect to an overall fluid flow direction as described elsewhere herein.

The upstream surface of the concentrator 120 can also include a second surface portion 126 positionable further into the return side relative to the first curved surface portion 122. The second surface portion can extend from a third position to a fourth position that is further into the return side and further downstream than the third position. The concentrator can have a deflection point 124 at which fluid is either deflected toward the push side or away from the push side. The concentrator 120 can be symmetrical as shown in the embodiment illustrated in FIG. 1, in which case the deflection point 124 can be the midpoint of the upstream surface. As shown in FIG. 1, the upstream surface portions on either side of the deflection point 124 can be convex facing upstream such that the entire upstream surface is a generally U-shaped surface that is convex facing upstream. The upstream surface can have a generally parabolic shape, which may or may not conform mathematically to a parabolic equation. The upstream surface as a whole can also be generally shaped as the leading end of an airfoil, which may or may not technically conform to a strict mathematical definition of an airfoil. As used throughout, the terms "parabola" and "airfoil" are broad terms, and the shaped surfaces these terms describe need not conform strictly to a mathematical definition of a "parabola" or "airfoil" shape.

The downstream surface of the concentrator 120 can be shaped and positioned to be concave facing downstream. In the embodiment illustrated in FIG. 1, the downstream surface of concentrator 120 includes an upstream flow surface 132, an intermediate surface 136, and a downstream flow surface 130. As will be discussed with reference to FIG. 2, the upstream flow surface 132 can be configured to receive fluid flowing upstream from the blade assembly 140 and direct the fluid toward the intermediate surface 136. The intermediate surface 136 can be configured to redirect at least some fluid from the upstream flow surface 132 to the downstream flow surface 130. The downstream flow surface 130 is shaped and configured to direct fluid downstream into the overall flow of fluid to eventually flow away from the blade assembly 140. As illustrated in the embodiment shown in FIG. 1, the downstream surface of the concentrator 120 can be substantially equidistant from the upstream surface of the concentrator 120, forming a concentrator 120 of substantially constant thickness. In some embodiments, the concentrator 120 as a whole can be shaped generally as a parabola, shaped generally as the leading end section of a substantially hollow airfoil, or be generally U-shaped. The concentrator 120 can also extend a distance Z past an outer end of a path of the blades on the return side, as shown in FIG. 1 and further described below.

The variable concentrator 110 illustrated in FIG. 1 will now be described. The variable concentrator 110 can be shaped generally as an airfoil. As illustrated in FIG. 1, a variable concentrator 110 has a leading edge 112, a trailing edge 118, and two side surfaces 114, 116. The variable concentrator 110 is located on the push side of the turbine system and upstream of the blade assembly 140. Side surface 114 can be a deflection surface that extends generally parallel to the axis Y along a substantial portion of a height of the blade assembly 140.

The variable concentrator 110 can be movable between a first position and a second position, and the variable concentrator 110 can be configured to deflect more fluid toward the blade assembly in the first position than in the second position. In some embodiments, the variable concentrator 110 is biased towards the first position by a biasing mechanism. The biasing mechanism may be active (e.g., a motor) or passive (e.g., a spring). As a speed of a fluid flowing past the variable concentrator 110 increases, the variable concentrator can move towards the second position in which less fluid or substantially no fluid is deflected toward the blade assembly 140. In some embodiments, the fluid flowing across the variable concentrator 110 causes the variable concentrator 110 to move. In some embodiments, a motor or other positioner can be used to position the variable concentrator 110 instead of or in addition to movement caused by the fluid flowing past the variable concentrator 110. The turbine system 100 can be configured to position the variable concentrator in the first position in low fluid speed environments and in the second position in high fluid speed environments. The variable concentrator can deflect fluid toward the blade assembly in low fluid speed environments and prevent high fluid speeds from damaging the turbine. Accordingly, the variable concentrator can also be called a governor.

The schematic shown in FIG. 1 includes a guide motor 102 and a tail fin 104 as part of the fluid turbine system 100. The guide motor 102 and the tail fin 104 can be used alone or in combination to maintain a relative position of one or more of the concentrator 120 and variable concentrator 110 generally upstream of the blade assembly 140. In some embodiments, the concentrator 120 is shaped and configured such that it automatically maintains a position upstream of blade assembly 140 and rotates around the outer perimeter of blade assembly 140 to maintain its upstream position. For example, as shown in FIG. 1, the curved symmetrical shape of the concentrator 120 can allow it to tend to face upstream into a fluid flow. In embodiments where one or more of the concentrator 120 or variable concentrator 110 are shaped and configured to face upstream in a given fluid flow, another of the variable concentrator 110, concentrator 120, or other components of the fluid turbine system can be coupled to the moveable component to also maintain a specified position in relation to the upstream direction. In some embodiments, the turbine system can be deployed in areas with a generally constant fluid (e.g., wind) direction and the concentrator 120 and variable concentrator 110 can have a relatively fixed position in relation to the blade assembly 140.

Figure 2:
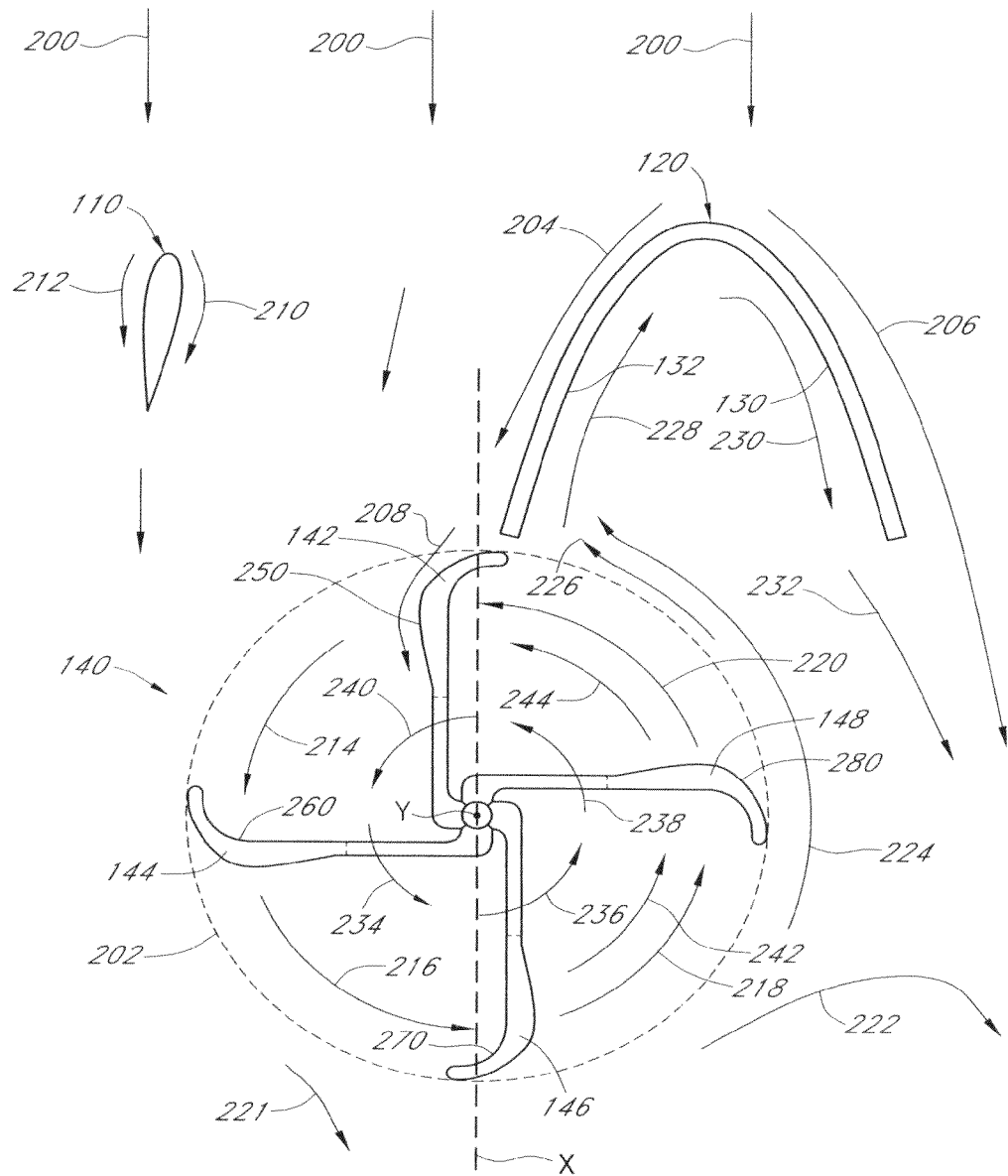
FIG. 2 is a top view of the fluid turbine system of FIG. 1 illustrating various possible flow paths of a fluid.

FIG. 2 is an example embodiment of a turbine system that includes a blade assembly 140, a concentrator 120, and a variable concentrator 110. The general direction of overall fluid flow is shown by arrows 200. FIG. 2 shows generally various possible fluid flow paths around the turbine system in response to an overall fluid flow approaching the turbine system as shown by arrows 200. For example, arrow 204 shows that some fluid can be directed toward the push side as shown in FIG. 2. Arrow 206 indicates that at least some fluid can be directed away from the push side and continue downstream eventually to flow away from the turbine system. Arrow 208 indicates that at least some fluid can flow across a back surface portion 250 of blade 142. As fluid flows across the back surface portion 250 of blade 142, the fluid velocity can increase. An increase in velocity of the fluid flowing along the path shown by arrow 208 can provide lift to blade 142, thereby providing torque that tends to rotate the blade assembly 140. Fluid flowing along the concentrator 120 (e.g., along paths indicated by arrows 204, 206) also tends to increase in velocity and compress. The compressed, concentrated fluid sped up by the concentrator 120 along the path indicated by arrow 204 flows into the push side, thereby providing more torque to rotate the blade assembly 140.

An outer perimeter of a sweep path of the blade assembly 140 is shown by broken line 202. As shown by arrows 214, 216, 218, 220 in FIG. 2, fluid within the sweep path of the blade assembly 140 can flow in a counterclockwise direction. Fluid flowing along the path indicated by arrow 214 can provide an impulse to the push surface 260 of blade 144. Fluid flowing along the path indicated by arrow 216 can provide an impulse to the catch surface 270 of blade 146. Concentrator 120 can be shaped, configured, and/or positioned such that the overall fluid flow will not act upon a drag surface 280 of blade 148. In the embodiment illustrated in FIG. 2, the portion of the concentrator located furthest into the return side extends beyond the sweep path in a direction perpendicular to plane X and away from the push side. Fluid flowing past the concentrator 120 along a path indicated by arrow 206 thus tends to flow downstream past the blade assembly 140 without impinging upon the drag surface 280 of blade 148, thereby increasing efficiency of the turbine system.

As indicated by arrows 224, 226, 228, 230, 232, the shape and position of the concentrator 120 can also cause fluid flowing upstream out of the sweep path of the blade assembly 140 to be redirected by concentrator 120 to flow downstream and eventually away from the blade assembly 140. In particular, fluid can flow along a path indicated by arrow 228 along an upstream flow surface 132 of the concentrator 120 and be redirected to flow downstream along a path indicated by arrow 230 along a downstream flow surface 130 of concentrator 120. Concentrator 120 can thereby provide a fluid escape path which continuously draws fluid away from the blade assembly 140. This continuous draw of fluid can create or contribute to a relative vacuum effect which tends to remove fluid from the sweep path of the blade assembly after the fluid has imparted an impulse to the blades.

As described above, an end of concentrator 120 can extend beyond a sweep path of the blades in a direction perpendicular to plane X and away from the push side, as shown by distance Z in FIG. 1. The positioning of the concentrator can thus create a blocking effect which not only prevents fluid flowing downstream from contacting blade 148, but can provide enough space for fluid to be drawn up into the concentrator without flowing against the overall fluid flow (e.g., along a path indicated by arrow 224). As fluid leaves the downstream flow surface 130 of the concentrator 120 (e.g., along a path indicated by arrow 232) it can join or flow alongside fluid which has been deflected from an upstream surface of the concentrator 120 (e.g., along a path indicated by arrow 206). In some embodiments, the concentrator 120 extends in a direction further into the return side at least to an outer edge of the turbine such that the concentrator at least intersects a second plane tangent to an outermost edge of the turbine and parallel to plane X. The second plane can be separated from plane X by a blade tip radius, and the concentrator can extend past the second plane by an extension distance measured in a direction perpendicular to plane X and away from the push side. In some embodiments, the extension distance can be at least five, at least ten, at least twenty, at least twenty-five, or at least thirty percent of the blade tip radius. In some embodiments, the extension distance is between about ten and about twenty percent of the blade tip radius. Preferably, the extension distance is between about twenty and thirty percent of the blade tip radius, between about twenty-three and twenty-seven percent of the blade tip radius, or about twenty-five percent of the blade tip radius. In some embodiments, the turbine has a return outer edge furthest away from the push side and the concentrator has a return end furthest away from the push side. In some embodiments, the closest distance between the return end of the concentrator and plane X is at least 1.1, at least 1.2, at least 1.3, at least 1.4, or at least 1.5 times greater than the closest distance between the return outer edge of the turbine and plane X. Preferably, the closest distance between the return end of the concentrator and plane X is between about 1.1 and 1.4, between about 1.2 and 1.3, or about 1.2 times greater than the closest distance between the return outer edge of the turbine and plane X.

The relative vacuum effect that can be created by the concentrator 120 can also cause a center of rotation of fluid near the blade assembly 140 to shift toward the return side or further into the return side. The general direction of fluid flowing in the open sections or windows of the blades is shown by arrows 234, 236, 238, 240. This fluid can be drawn out away from the blade assembly by the concentrator 120 as shown in part by arrows 242, 244. Arrows 221 and 222 indicate that at least some fluid can escape the sweep path of the blade assembly 140 and flow generally downstream away from the turbine system without being drawn fully toward the downstream surface of the concentrator and redirected away from the concentrator.

In the embodiment of the turbine system illustrated in FIG. 2, the variable concentrator 110 is positioned such that it deflects little or no fluid toward the blade assembly 140, or only a small amount of fluid, no more fluid, or slightly less fluid than would flow toward the blade assembly 140 due to the overall fluid flow defined by arrows 200 in the absence of the variable concentrator 110. In some embodiments, fluid flowing along the side surfaces of the variable concentrator (e.g., along paths indicated by arrows 210, 212) can increase in speed temporarily, but is not directed further toward the blade assembly 140 than the overall flow of fluid. In some embodiments, the variable concentrator 110 is shaped and positioned such that when it is not directing fluid toward the blade assembly 140 it provides a slight blocking effect to prevent high fluid speeds from damaging the blade assembly 140.

With further reference to FIG. 2, the blade assembly 140 in the position illustrated in FIG. 2 has a blade 142 in the lift position, a blade 144 in the push position, a blade 146 in the catch position, and a blade 148 in the return position. In some embodiments, a blade assembly 140 has a torque position in which at least one blade is in a lift position, at least one blade is in a push position, at least one blade is in a catch position, and at least one blade is in a return position. As the blade assembly 140 rotates, the blades can change positions. In some embodiments, the blade assembly 140 is always in a torque position as it rotates, such that favorable torque characteristics of the lift position, the push position, the catch position, and the return position are constantly exhibited as the turbine rotates in response to an input fluid. In some embodiments, each blade is primarily only in one of the lift position, push position, catch position, and return position. In some embodiments with four blades, for one or more rotational positions of the blade assembly 140 there is only one lift blade, one push blade, one catch blade, and one return blade, the blades being categorized by their primary or dominant position.

Figure 3A:
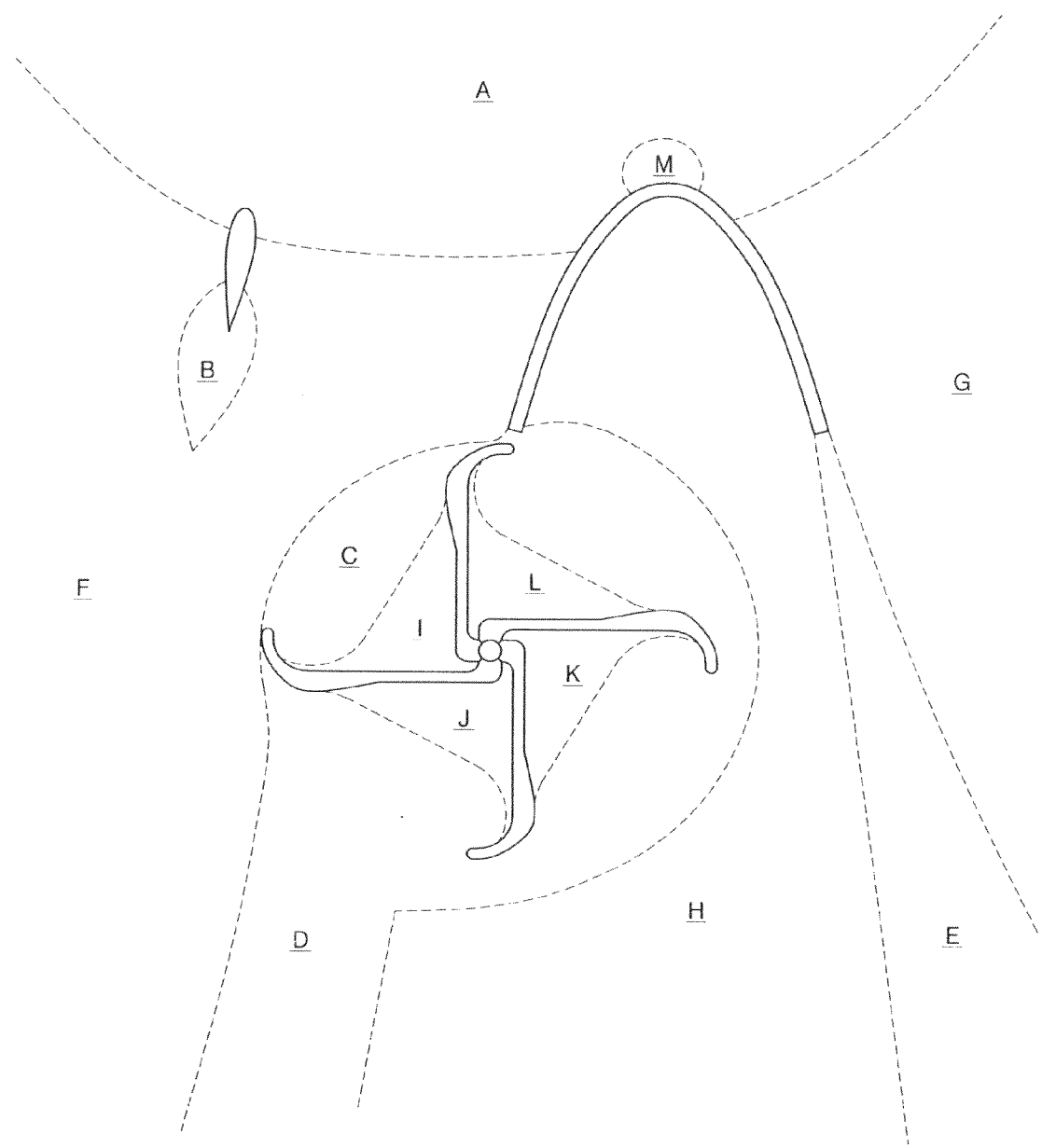
FIG. 3A is a top view of the fluid turbine system of FIG. 1 illustrating various possible velocity zones.

FIG. 3A is a top view of a turbine system similar to that shown in FIG. 2 and illustrates various zones of relative velocity of fluid flowing along the paths illustrated in FIG. 2 resulting from the described features. Zones A, B, C, D and E illustrate areas of a relatively medium fluid velocity. Zones F and G indicate zones of relatively high fluid velocity. Zones H, I, J, K, L, and M illustrate zones of relatively low velocity.

Figure 3B:
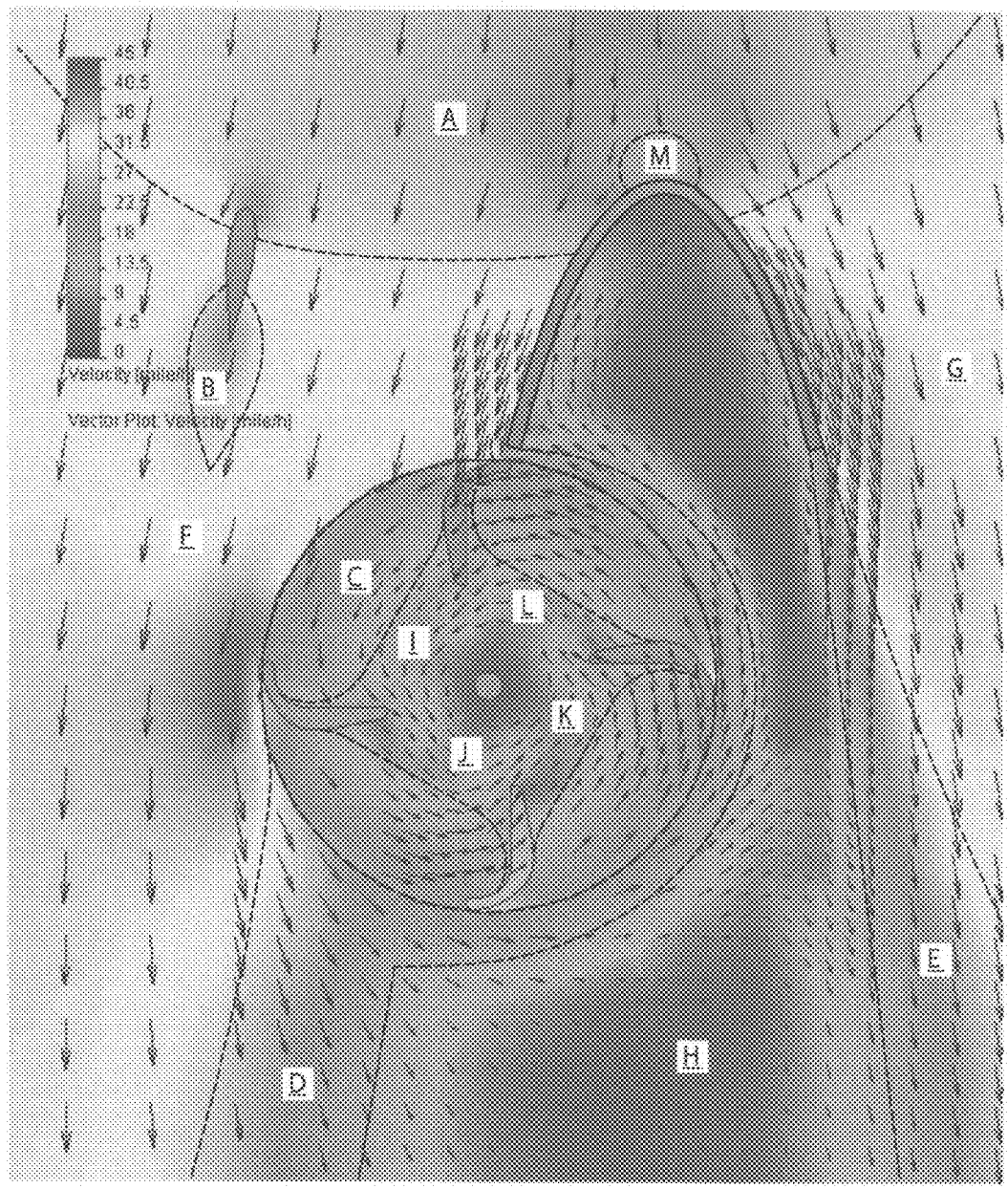
FIG. 3B is a fluid velocity plot of the vertical axis fluid turbine system of FIG. 1 showing approximate velocity zones illustrated in FIG. 3A.

FIG. 3B is an example velocity plot of an embodiment of a turbine system with an input velocity near 28 mph. FIG. 3B illustrates that Zones A, B, C, D, and E have a fluid velocity near the input velocity. Zones F and G have fluid velocities greater than the input velocity, while Zones H, I, J, K, L, M have fluid velocities below the input velocity. As shown in FIG. 3B, an input velocity near 28 mph can create velocities of at least 45 mph as shown in Zone F near the push side of the blade assembly. The velocity plot also includes velocity vectors which can show a relative concentration of fluid. In particular, FIG. 3B illustrates an increase in concentration of fluid near the concentrator.

Figure 4A:
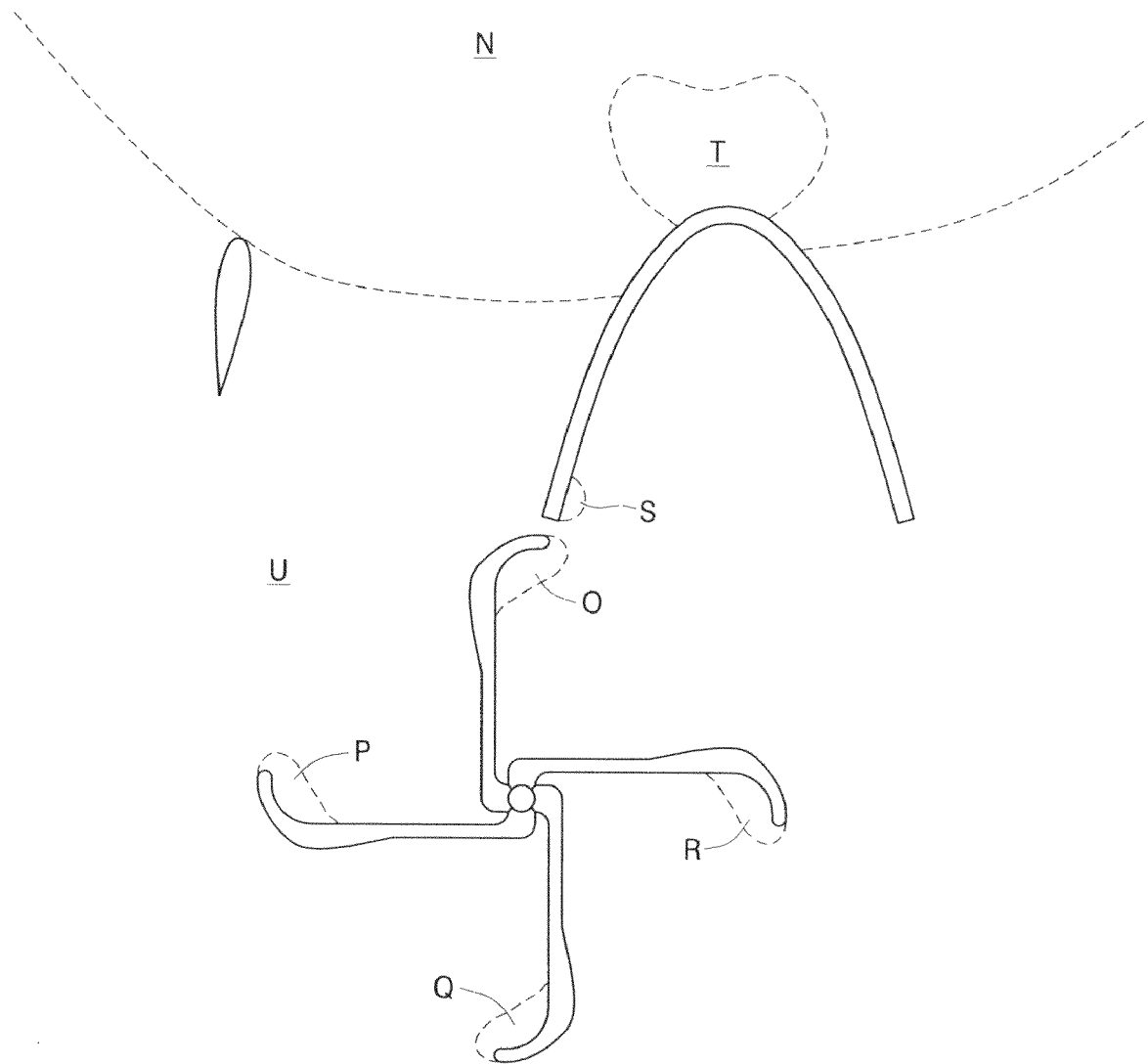
FIG. 4A is a top view of the fluid turbine system of FIG. 1 showing various possible pressure zones.

FIG. 4A is a top view of a turbine system showing various zones of relative pressure of a fluid surrounding the turbine system. Assuming a direction of overall fluid flow as shown in FIG. 2, the turbine system illustrated in FIG. 4A can have medium pressure zones shown as Zones N, O, P, Q, R, and S in FIG. 4A. The turbine system can have a high pressure zone shown as Zone T and a lower pressure zone indicated as Zone U in FIG. 4A.

Figure 4B:
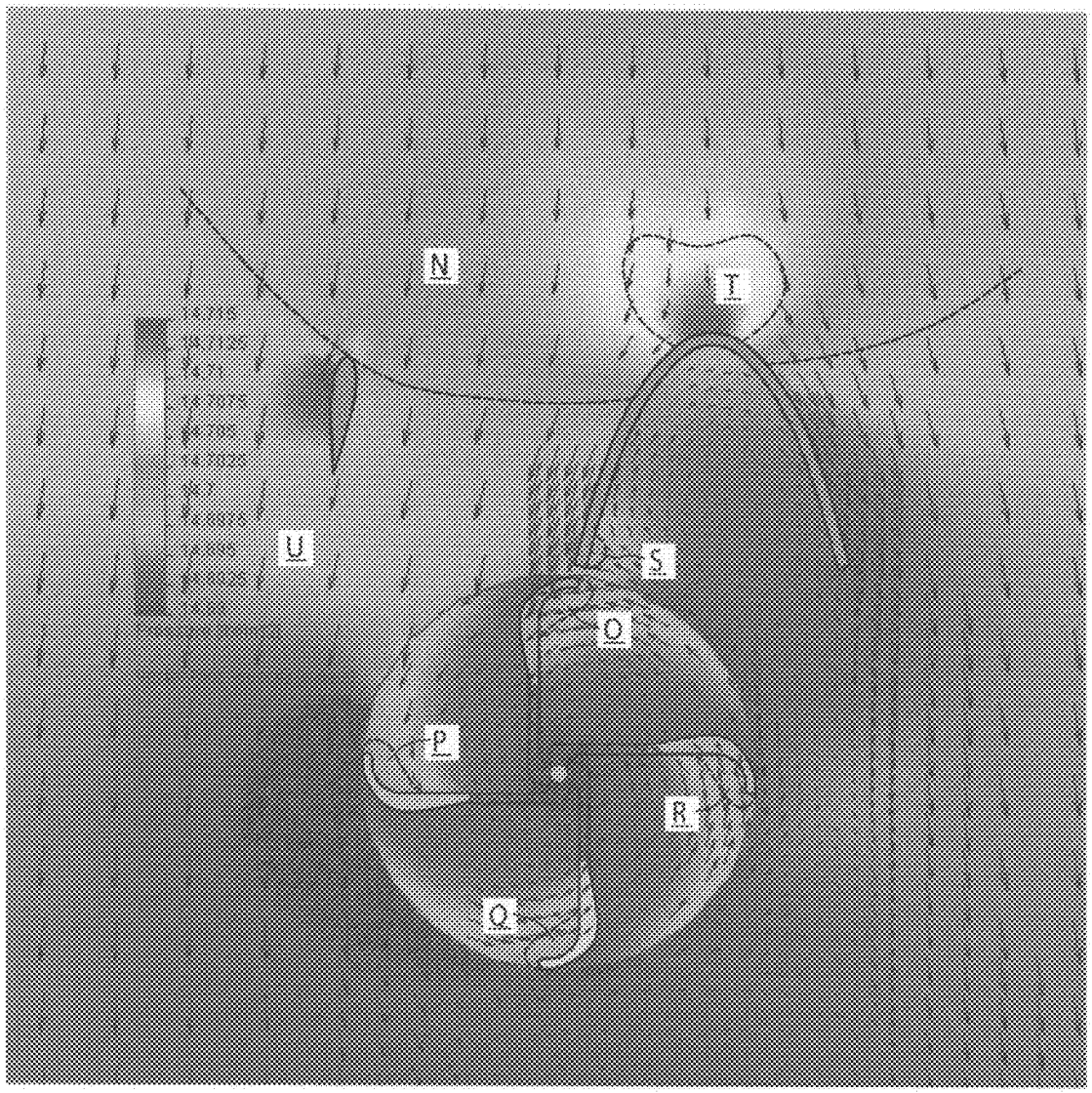
FIG. 4B is a pressure plot showing pressure developed by fluid as it passes across the vertical axis fluid turbine system of FIG. 1.

FIG. 4B is a pressure plot of an example embodiment of a turbine system. A pressure of the input fluid flowing according to the illustrated velocity vectors in FIG. 4B is a medium pressure occupying Zone N. As in FIG. 4A, other zones of medium range pressure include Zones O, P, Q, R, and S. Again, as in FIG. 4A, Zone T is a high pressure zone and Zone U is a low pressure zone relative to a pressure of the input fluid.

Figure 5:
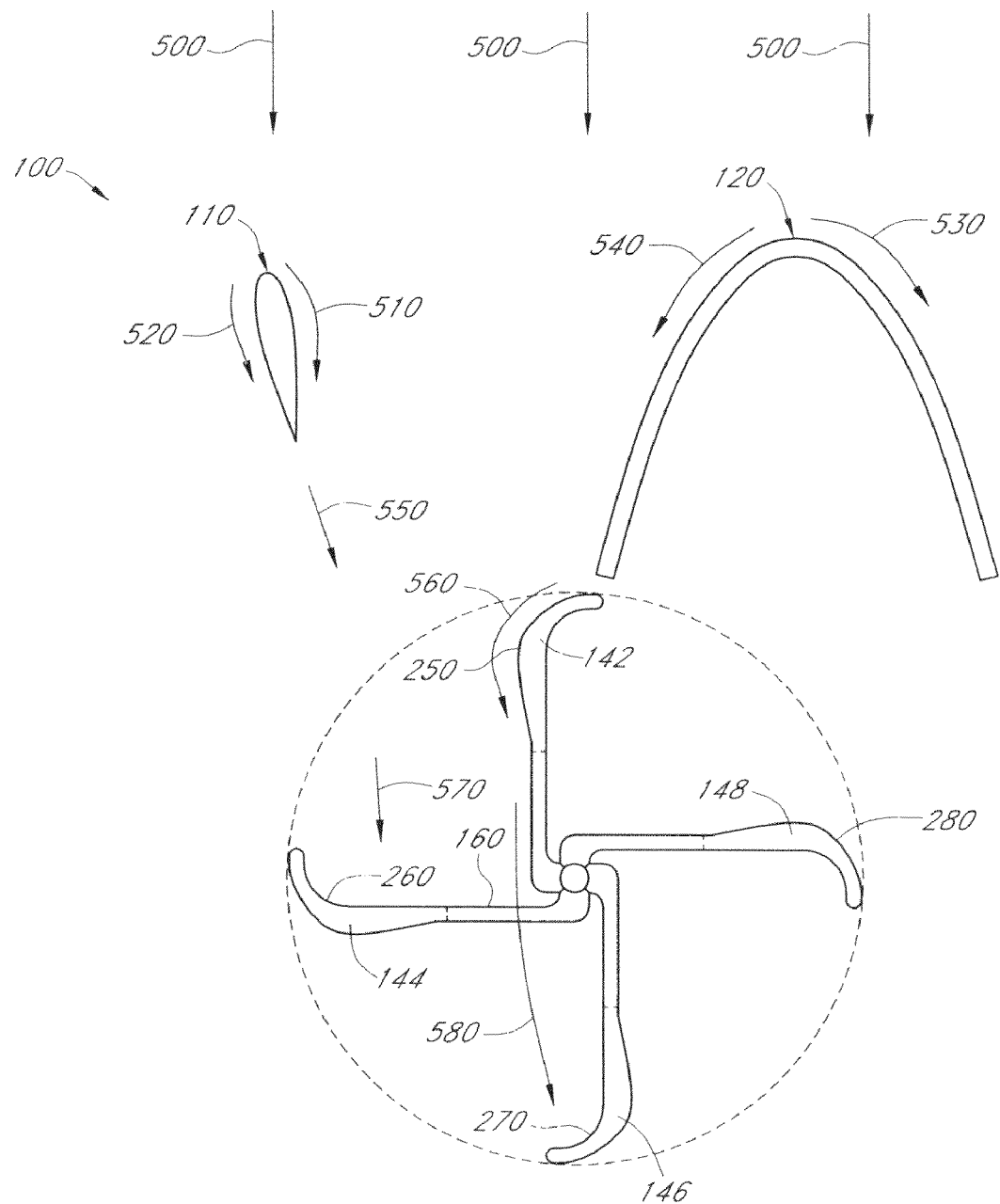
FIG. 5 is a top view of the fluid turbine system of FIG. 1 with a variable concentrator showing possible fluid flow paths at low speed.

FIG. 5 illustrates another embodiment of a turbine system 100. In FIG. 5 the variable concentrator 110 is positioned to deflect fluid toward the blade assembly. In particular, at low fluid (e.g., wind) speeds, a variable concentrator positioned to deflect fluid toward the blade assembly can decrease a startup fluid speed of the turbine system and increase efficiency of the system at low fluid speeds. Fluid can flow around the variable concentrator 110 as indicated by arrows 510, 520. The shape of the variable concentrator 110 can cause the fluid to increase in velocity and compress as it flows around the variable concentrator 110. The variable concentrator 110 can also be positioned such that fluid leaving the variable concentrator 110 can then flow along the path as indicated by arrow 550 toward the blade assembly. At least some of this fluid can act on one or more of the blades 142, 144, 146, 148 of the blade assembly, and in particular on a push surface 260 of blade 144 in the blade position illustrated in FIG. 5.

In some embodiments, various features of the fluid turbine system 100 can increase torque output of the system or decrease a speed of fluid needed to begin rotating the blade assembly. For example, when the blade assembly is stationary in the position illustrated in FIG. 5, a fluid can provide torque from at least blades 142, 144, and 146. In particular, fluid flowing across the curved surface portion 250 of blade 142 as indicated by arrow 560 can create a lift effect tending to rotate blade 142. At least some fluid can also flow through the open section of blade 144 located near the generally straight section 160 of blade 144 and act on the catch surface 270 of blade 146. When the catch surface 270 is located directly downstream from the open section of blade 144, fluid flowing directly downstream can flow through the open section of blade 144 and against the catch surface 270 of blade 146. In some embodiments, e.g., as shown in FIG. 5, fluid deflected by other surfaces of the turbine system 100 (e.g., surfaces on variable concentrator 110 or on curved surface portion 250 of blade 142) causes fluid to veer from the direction of the overall fluid flow and impinge against portions of blade 146 not located directly downstream from the open section of blade 144. Fluid from the overall fluid flow or directed towards the blade assembly from the variable concentrator 110 can also act on the push surface portion 260 of blade 144. Accordingly, a flow of fluid across the blade assembly stationary in the position of FIG. 5 can provide torque from at least three of the blades illustrated in FIG. 5. Fluid flowing past a rotating blade assembly 140 can also provide torque from at least three of the blades simultaneously.

As discussed above with reference to FIG. 2, the concentrator 120 shown in FIG. 5 can also block the overall fluid flow from creating additional drag on the drag surface 280 of blade 148. The concentrator 120 can also increase the velocity of and compress the fluid flowing along a path indicated by arrow 540. Fluid flowing away from the push side along arrow 530 is also concentrated and compressed, which can aid in drawing fluid away from the blade assembly as described above with reference to FIG. 2.

Figure 6A:
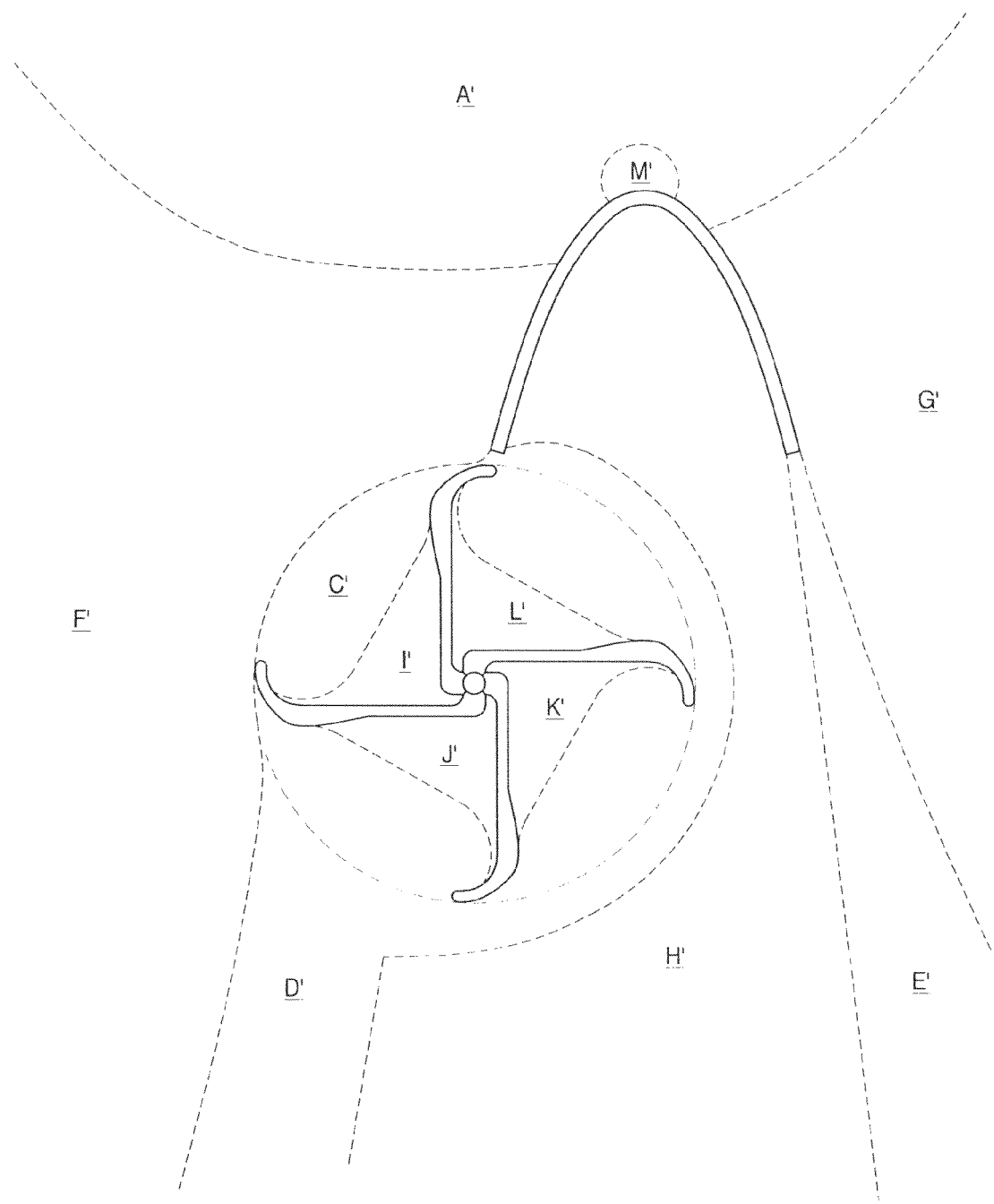
FIG. 6A is a top view of another embodiment of a fluid turbine system without a variable concentrator illustrating various possible velocity zones.

FIG. 6A is a top view of a turbine system without a variable concentrator. FIG. 6A indicates various velocity zones of fluid flowing around the turbine system. The velocity of the input fluid is shown in Zone A'. The input fluid has a velocity in the medium range, along with the fluids in Zones C', D', and E'. The fluid in Zones F' and G' flows at a higher velocity than the input fluid, and the fluid in Zones H', I', J', K', L', and M' flows at a lower velocity than the input fluid.

Figure 6B:
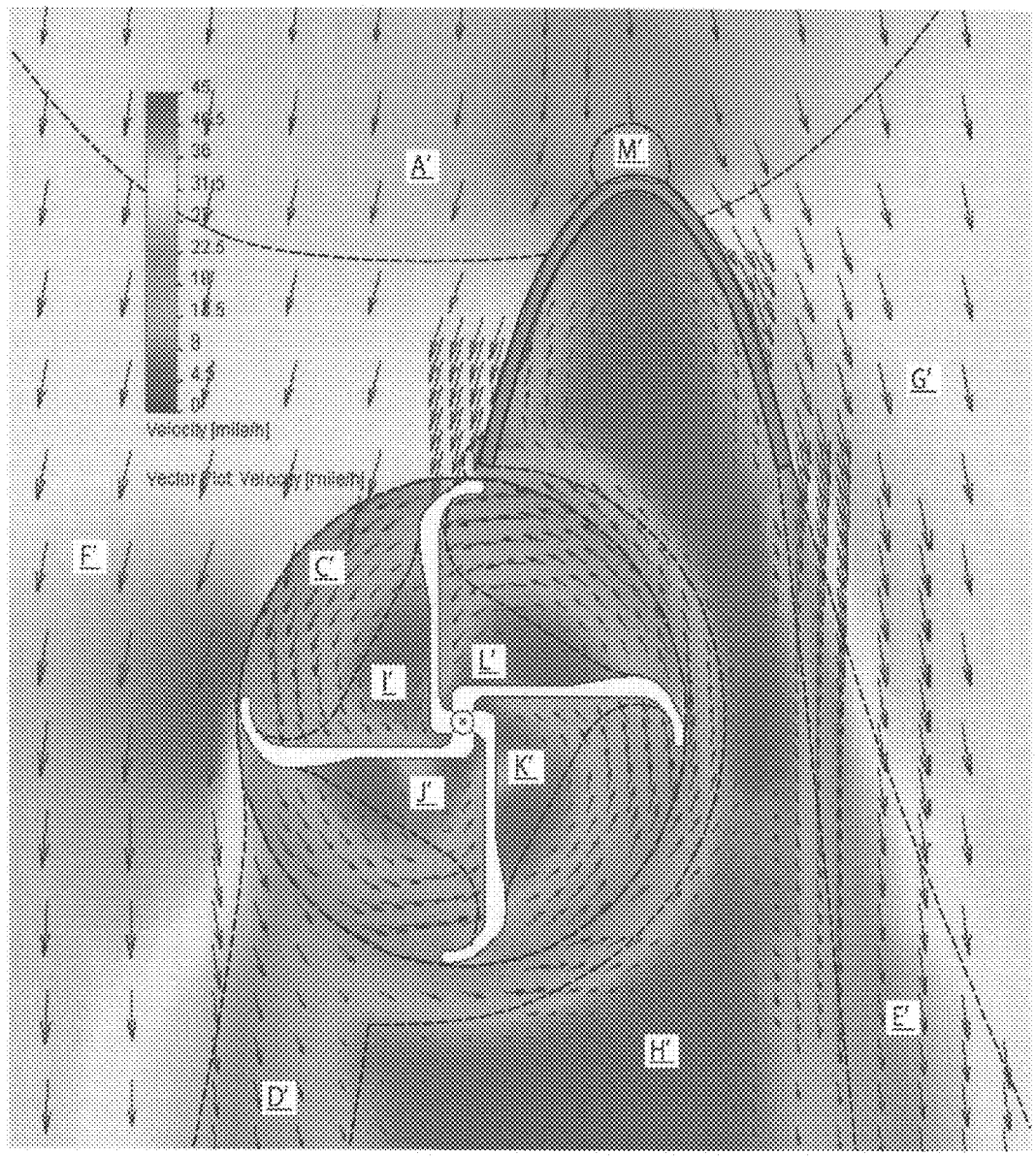
FIG. 6B is a velocity plot of the vertical axis fluid turbine system of FIG. 6.

FIG. 6B is a velocity plot of an example embodiment of a turbine system similar to the embodiment shown in FIG. 6A. The input velocity is 28 mph with a maximum velocity of at least 45 mph as shown in Zone F'. Medium range velocity zones are designated as A', C', D', and E'. High fluid velocity zones include F' and G'. Low fluid velocity zones include H', I', J', K', L', and M'. Direction of fluid flow and relative concentration of the fluid is indicated by the velocity vectors in the velocity plot of FIG. 6B. The darker-shaded area in Zone F' indicates maximum speeds near this location on the push side. The maximum speed area in zone F' of FIG. 5 is larger than the maximum speed area in zone F of FIG. 3B, indicating that the variable concentrator and its position in FIG. 3B can reduce the amount of fluid flowing at maximum speeds, thereby preventing damage to the turbine in high fluid speeds.

Figure 7:
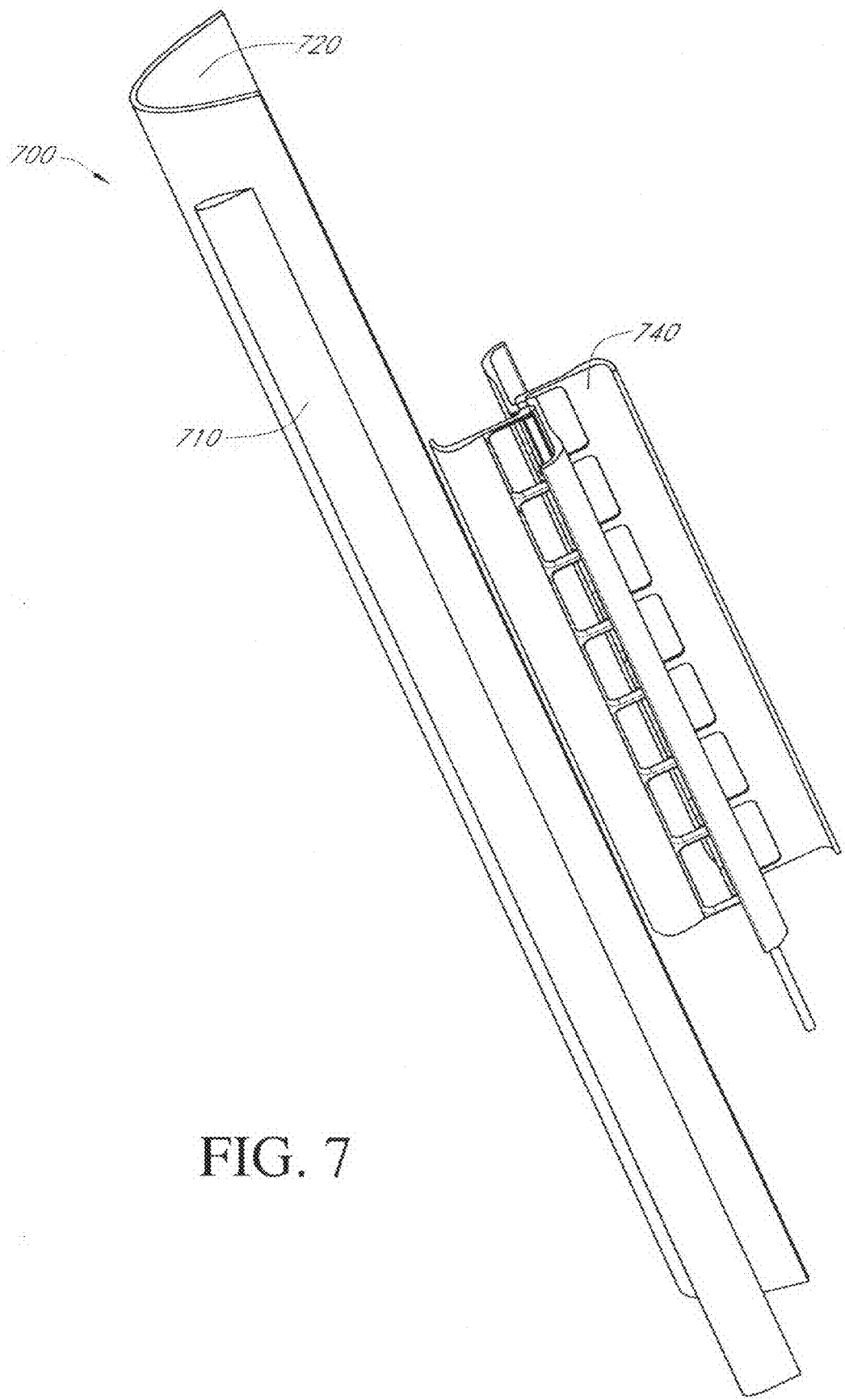
FIG. 7 is a perspective view of components of an embodiment of a fluid turbine system with a blade assembly, a concentrator, and a variable concentrator.

FIG. 7 shows an embodiment of a fluid turbine system 700. The fluid turbine system 700 comprises a blade assembly 740, a concentrator 720, and a variable concentrator 710. The blade assembly 740, concentrator 720, and variable concentrator 710 can be similar to the blade assembly 140, concentrator 120, and variable concentrator 110 described herein. In the embodiment illustrated in FIG. 7, the concentrator 720 and variable concentrator 710 have a height that is substantially greater than a height of the blade assembly 740. In some embodiments, a height of the blade assembly 740, concentrator 720, and variable concentrator is substantially equal. In some embodiments, a height of one or more of the concentrator 720 or variable concentrator is at least a substantial portion of a height of one or more blades of the blade assembly.

Figure 8:
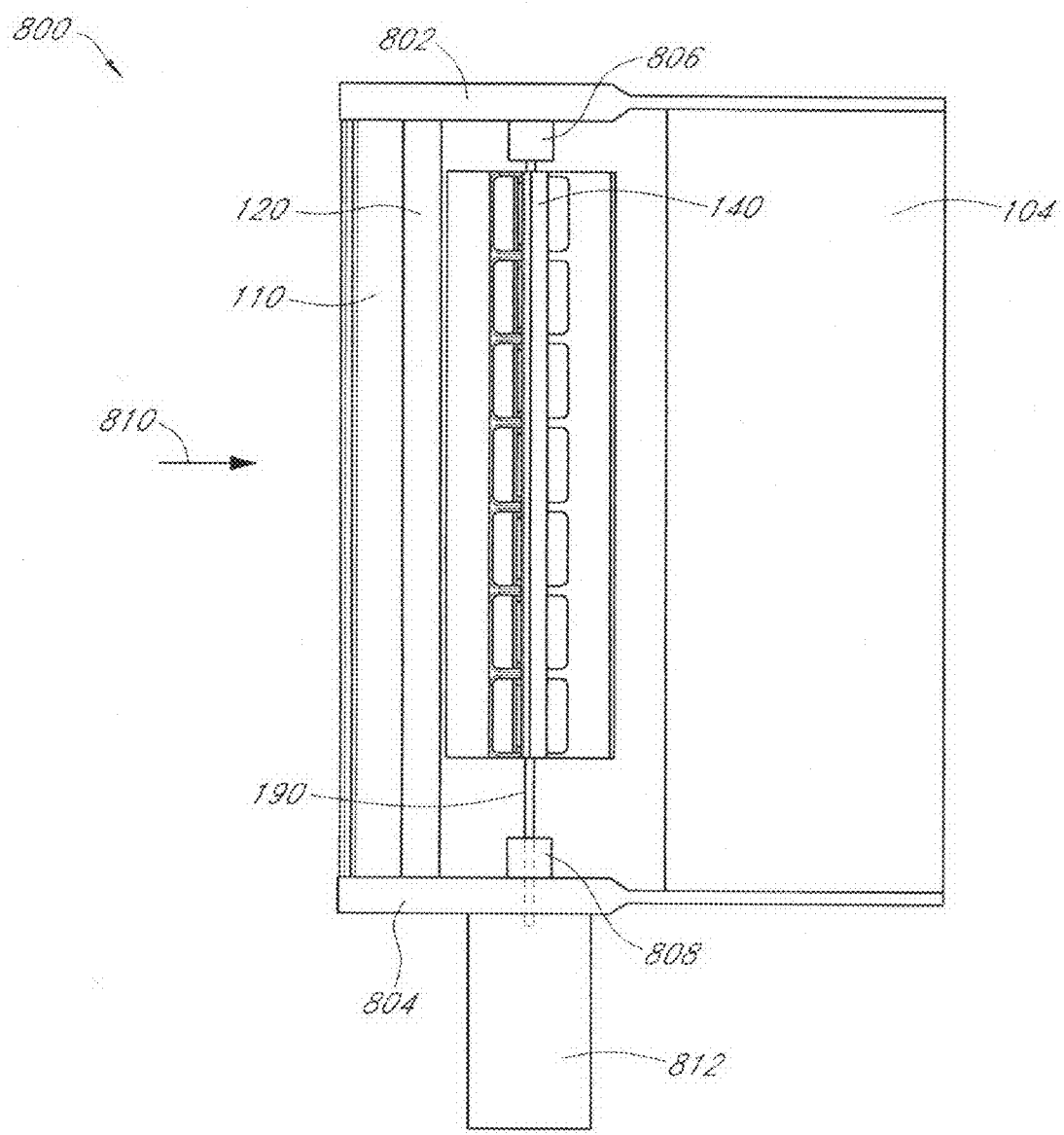
FIG. 8 is a side view of a fluid turbine system including the components of FIG. 7 and also illustrating a tail fin.

FIG. 8 is a side view of an embodiment of a vertical axis fluid turbine system 800. For purposes of discussion, the fluid direction is shown by the arrow 810. Bearing cases 806, 808 at the top and bottom of a central shaft 190 of a blade assembly 140 allow the blade assembly 140 to rotate. The bearing case 806 can be mounted to an upper bracket 802, and the bearing case 808 can be mounted to a lower bracket 804. In the embodiment illustrated in FIG. 8, the upper and lower brackets 802, 804 can rotate relative to a base 812 at the bottom of the turbine system 800. A tail fin 104 can extend between the upper and lower brackets 802, 804. The tail fin 104 can orient the system such that a concentrator 120 and variable concentrator 110 will be upstream (e.g., upwind) of the blade assembly 140 and face into an approaching fluid (e.g., wind). The variable concentrator 110 and the concentrator 120 extend between the upper and lower brackets 802, 804 on the left of the blade assembly as shown in FIG. 8. In some embodiments, the concentrator 120 is fixed in relation to the upper and lower brackets 802, 804 and the variable concentrator is rotatably fixed to the upper and lower brackets 802, 804. In some embodiments, a gearbox 106 can be used to convert the speed of the rotation of the blade assembly 140 to a speed optimal for converting rotational energy into electrical power. The gearbox 106 can be located in the base 812 of the system.

A guide motor 102, which can be a servo motor, can also be used instead of or in addition to the tail fin 104 to orient the upper and lower brackets 802, 804 in relation to the base 812. The guide motor 102 can be connected to a sensor, which in some embodiments can sense the direction of fluid flow (e.g., wind) and orient the turbine system 800 such that the concentrator 120 and variable concentrator 110 are upstream (e.g., upwind) of the blade assembly. The guide motor 102 can be used to stabilize the system and prevent the tail fin 104 from oscillating or turning in response to slight changes in fluid flow direction. In some embodiments, a damper (not shown) can be used instead of or in addition to the guide motor 102 to slow the response of the system to minute changes in fluid flow direction. A second guide motor (not shown) can be used to orient the variable concentrator 110. The second guide motor can be connected to a sensor which in some embodiments can sense fluid speed and orient the variable concentrator 110 away from the blade assembly 140 when the system 800 is subjected to high fluid speeds (e.g., in high winds) to divert fluid away from the blade assembly 140. One or more of the guide motors can be located within the base 812. Other configurations of brackets or mounting members for the blade assembly 140, concentrator 120, and variable concentrator 110 can be used. These designs can also be optimized to promote efficient conversion of fluid energy. In some embodiments, one or more of the blade assembly 140, concentrator 120, or variable concentrator 110 are mounted separately and may be separately moveable in relation to one or more of the other components. The fluid turbine system 800 can also include a starter. The starter can help to begin rotation of the blade assembly 140. In some embodiments, a starter is not necessary and the blade assembly 140 will self-start in appropriate fluid conditions.

Figure 9:
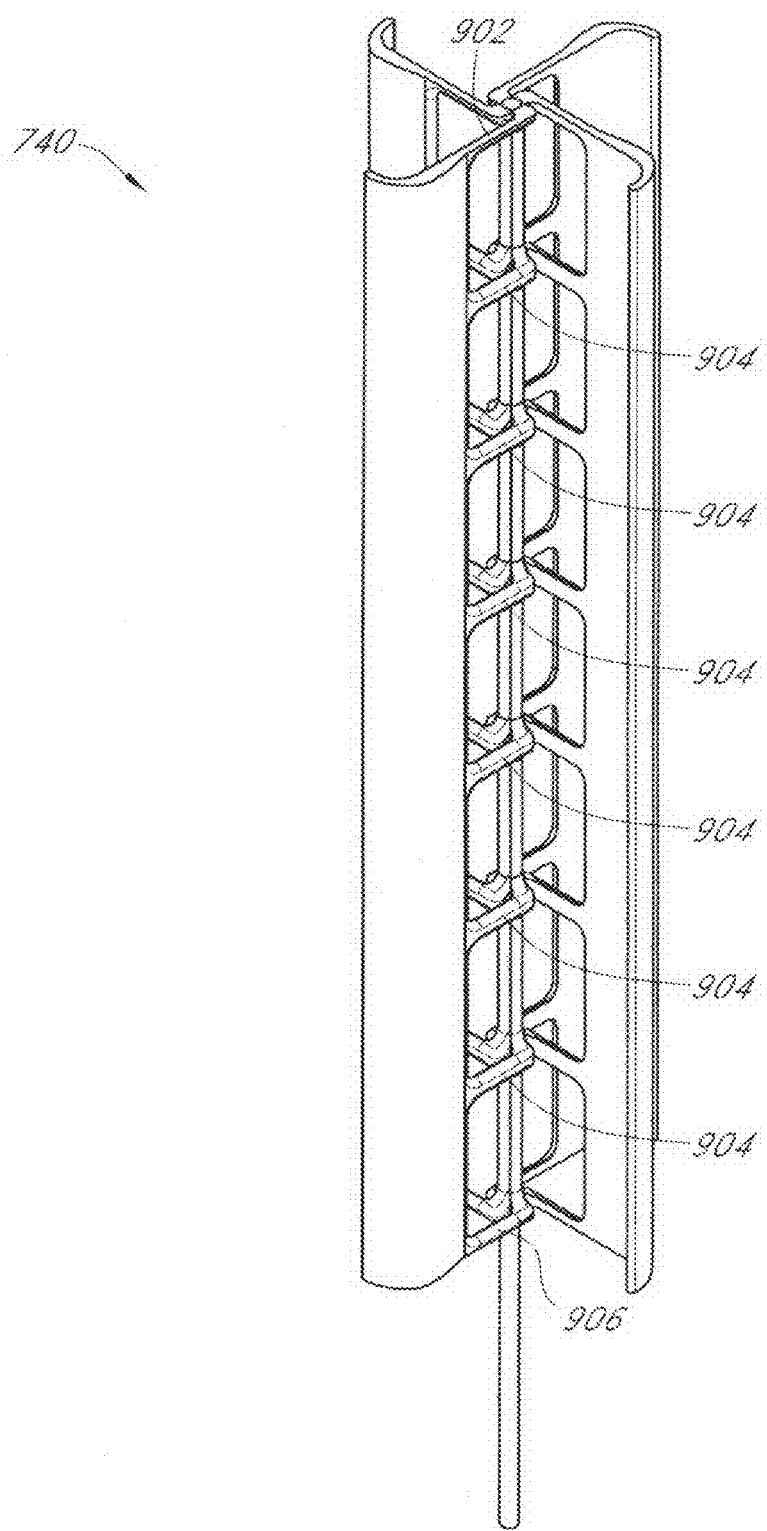
FIG. 9 is a perspective view of a blade assembly of the fluid turbine system of FIG. 8.
Figure 10:
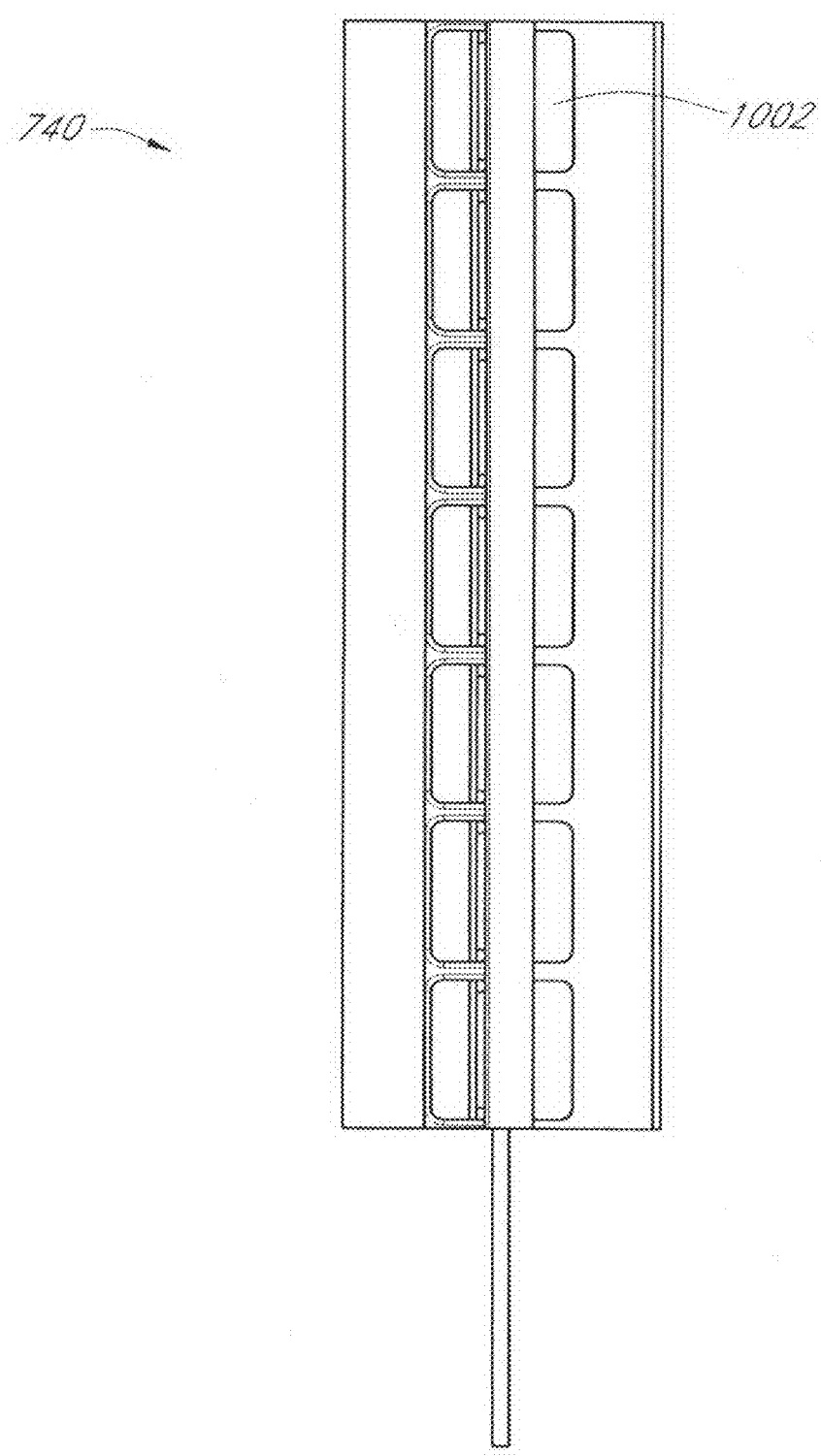
FIG. 10 is a front view of the blade assembly shown in FIG. 9.

FIGS. 9-10 show a blade assembly 740 with four blades. Approximately an inner radial half of the blades is substantially open. A top blade support 902, middle blade supports 904, and a bottom blade support 906 extend from an axis of rotation to a substantially solid portion of the blade located further from the axis than the open sections. As seen in FIGS. 9 and 10, an open section or window can extend along a substantial portion of a height of the blades. The open sections can be continuous or discontinuous. For example, opening 1002 in FIG. 10 can be a viewed as a continuous opening 1002 or a small section of a single discontinuous opening extending along a height of the blade.

Figure 11:
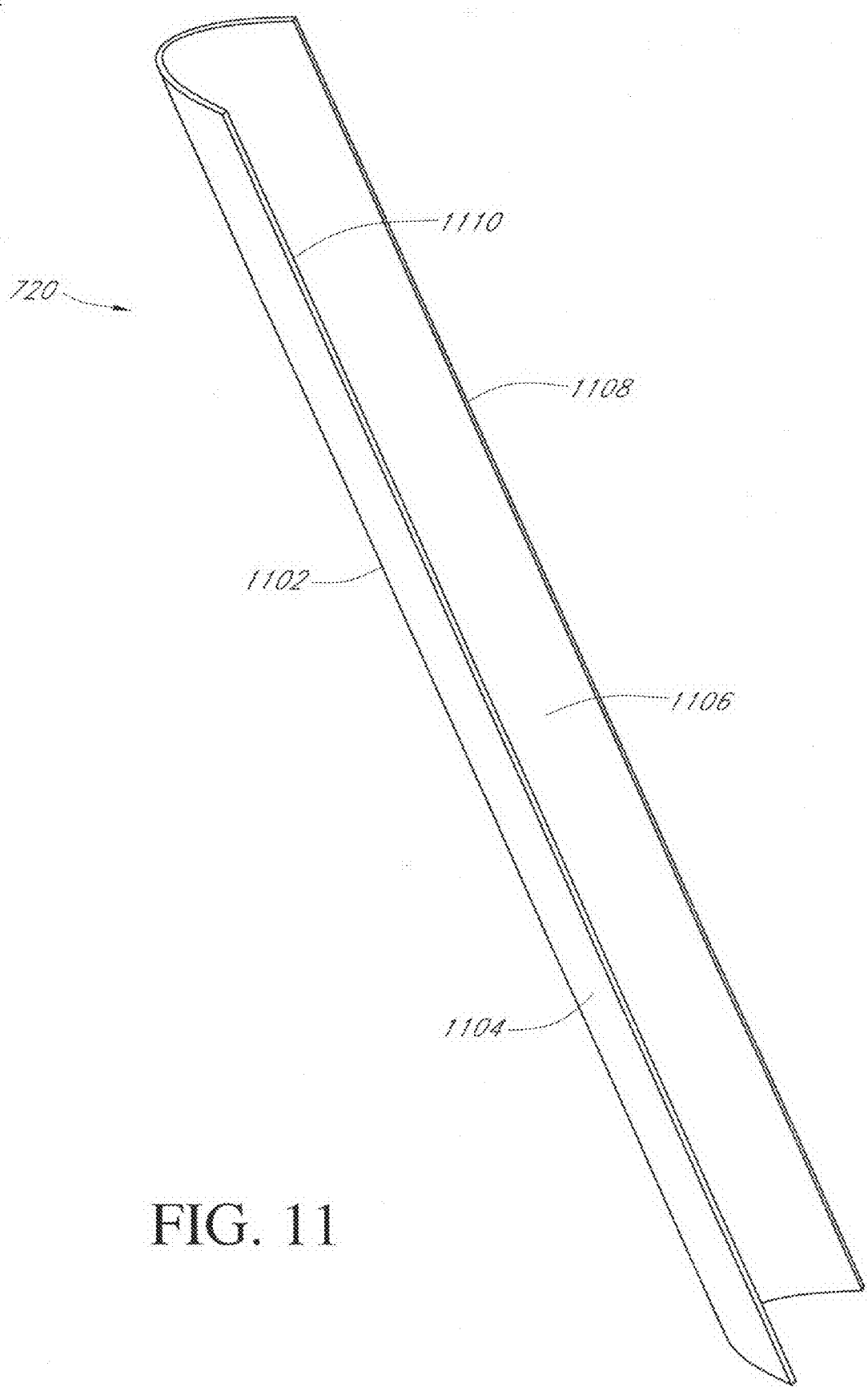
FIG. 11 is a perspective view of the concentrator of the fluid turbine system of FIG. 8.

FIG. 11 is a perspective view of the concentrator 720 shown in FIG. 7. The concentrator 720 comprises an upstream surface 1104 and a downstream surface 1106. A leading edge 1102 of the concentrator 720 is configured to divide fluid flowing toward the concentrator 720 into a push portion of fluid to flow toward a push half of the turbine and a return portion of fluid to flow away from the push half of the turbine. Trailing edges 1110, 1108 can be positionable downstream of the leading edge 1102. Trailing edge 110 can correspond to the push end 134 of the concentrator 120 shown in FIGS. 1 and 2. Trailing edge 112 can correspond to the return end 128 of the concentrator 120 shown in FIGS. 1 and 2.

Figure 12:
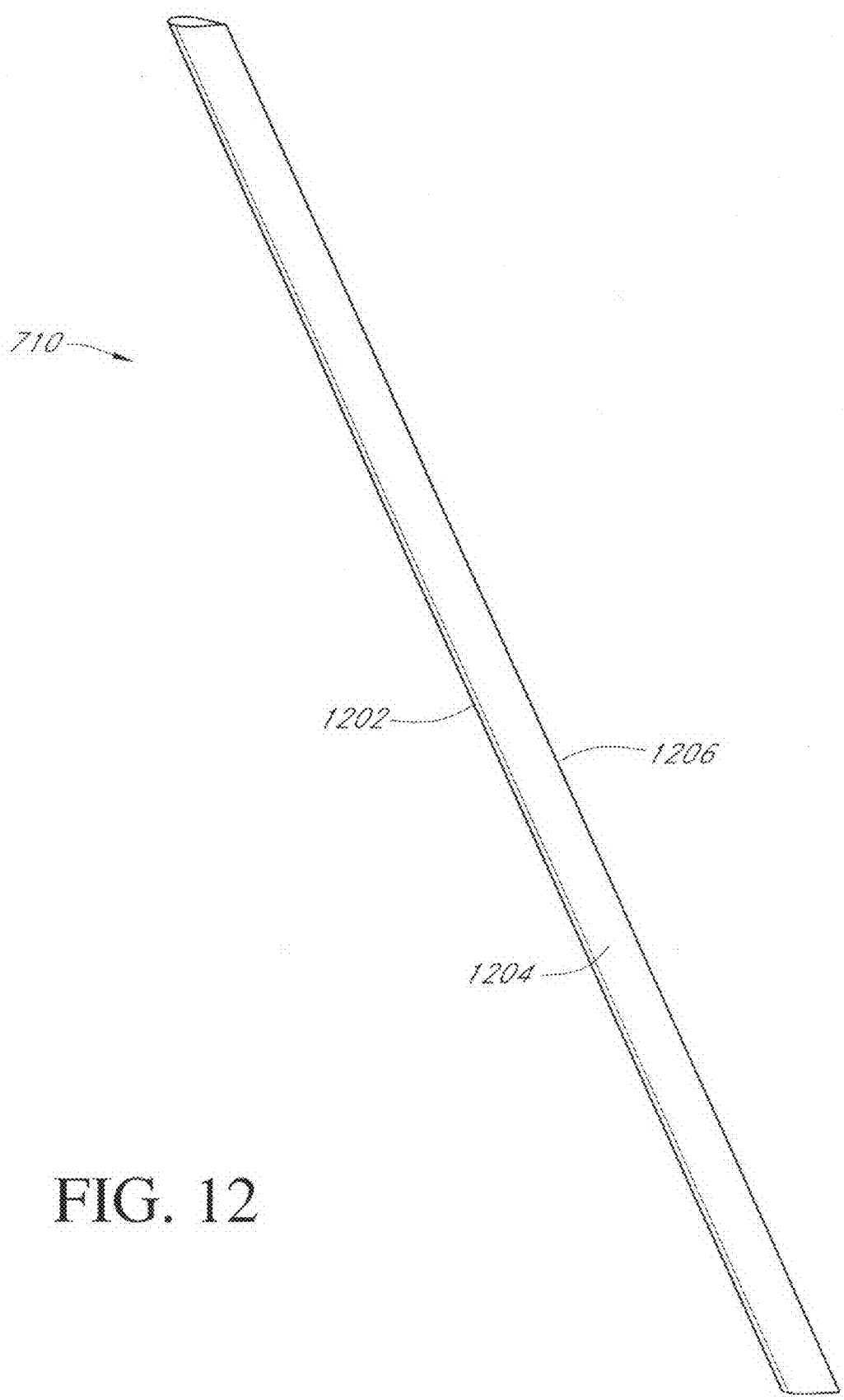
FIG. 12 is a perspective view of the variable concentrator of the fluid turbine system of FIG. 8.

FIG. 12 is a perspective view of the variable concentrator 710 shown in FIG. 7. The variable concentrator 710 can have a leading edge 1202, a trailing edge 1206, and a side deflection surface 1204. Trailing edge 1206 can be positionable downstream of leading edge 1202.

Figure 13:
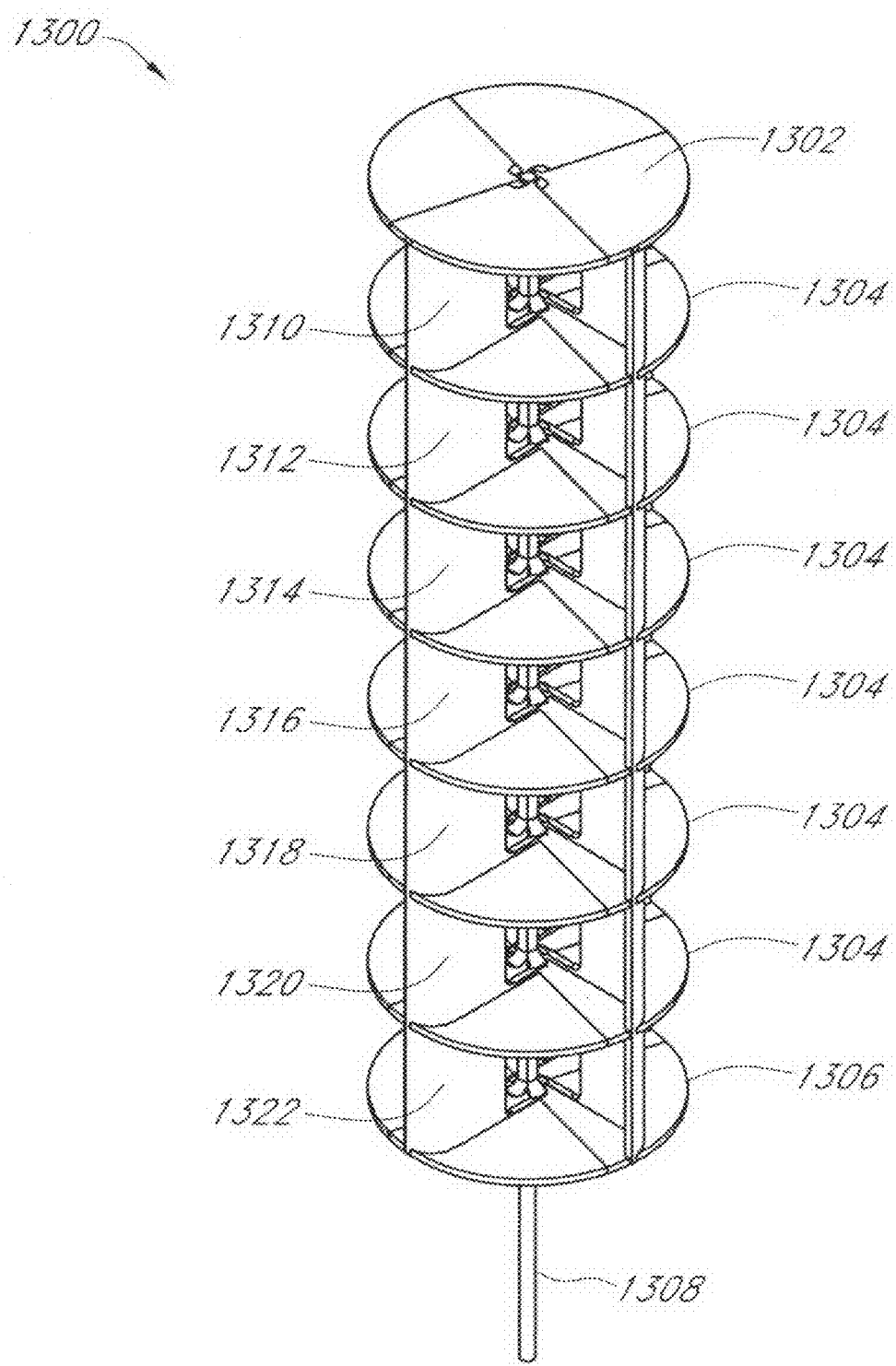
FIG. 13 is a perspective view of another embodiment of a blade assembly.
Figure 14:
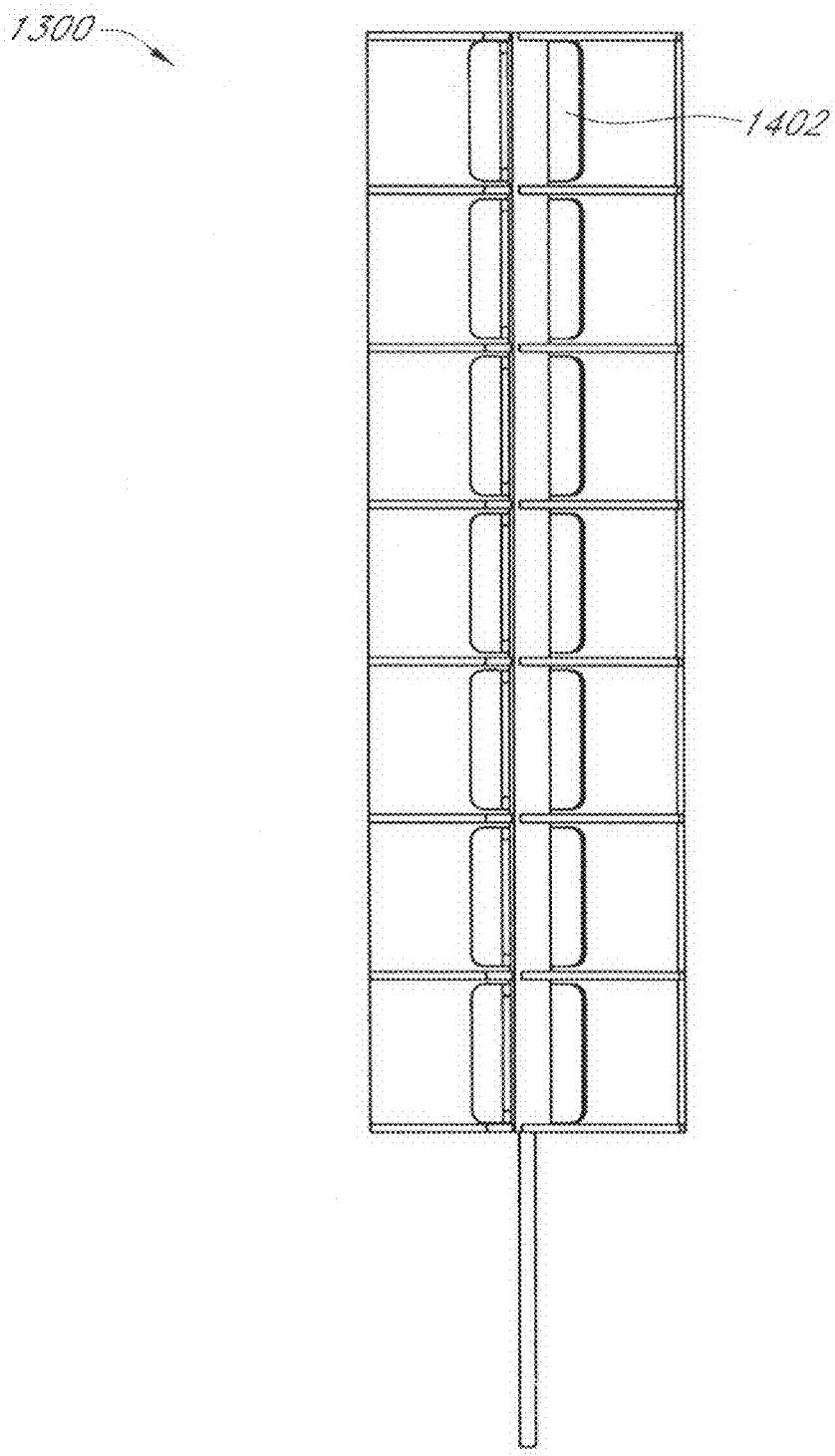
FIG. 14 is a front view of a blade assembly shown in FIG. 13.

FIGS. 13-14 show an embodiment of a blade assembly 1300 that can be configured for use in a fluid turbine system similar to those described above. The embodiment of a blade assembly 1300 shown in FIG. 13 can be similar to the embodiment depicted of the blade assembly 140 in FIG. 1, with the addition of horizontal plates mounted periodically along the length of the blade assembly. As shown in FIG. 13, the blade assembly 1300 can have seven sections, each with a horizontal plate at the top and bottom of the section. The blades can have an open section or windows, which can be located near the central portion of each blade section. FIG. 14 shows a front view of the blade assembly 1300, with opening 1402 near the central portion of the blade.

In some embodiments, the blade assembly 1300 can be modular. For example, each of the seven blade assembly sections can be a separate piece mounted separately to a central shaft 1308. A modular blade assembly can allow for ease of manipulation of the number of blade sections in a turbine system design based on user preferences or available space. One example method of assembling the blade assembly 1300 can be as follows: (1) provide a central shaft 1308 with a bottom plate 1306 fixed to the shaft; (2) provide a blade assembly section comprising a plate 1304 comprising blade sections projecting from the underside of the plate 1304, the blade sections comprising an opening toward the center of the plate 1304; (3) mounting the blade assembly section to the central shaft 1308; and (4) mounting additional blade assembly sections to the central shaft 1308, with the final blade assembly section comprising top plate 1302. In some embodiments, one or more blade assembly sections can comprise a plate 1304 at the bottom of the blade assembly section instead of the top. In some embodiments, the horizontal plates can be separate from the blades, or could be omitted altogether.

In some embodiments, one or more portions of the blade assembly can be offset radially from one or more of the other portions. For example, the blades in one section of a modular blade assembly may not align with the blades in the section above and/or below it, unlike the blade assembly depicted in FIG. 13 in which the blades of each section are aligned to effectively form a straight blade along the height of the blade assembly. Offsetting the blade sections can aid in creating a non-cyclic torque output. In some embodiments, each section of the blade assembly is offset from the others by ten degrees. In some embodiments, each section is offset by between about 1 and about 20, between about 5 and 15, or between about 8 and 12 degrees of a section below or above it. In some embodiments, an even offset can be calculated based on the number of blades in each section and/or the number of sections to evenly place blades around the central shaft in various patterns. In some embodiments, the offset is not even among the different sections.

In some embodiments, the offset of the different blade sections can create a helical shape or "virtual helix." For example, a blade 1322 at the bottom section of the blade assembly 1300 can be mounted in a reference position of 0 degrees relative to the central shaft 1308. A blade 1320 in the next section can be mounted at 10 degrees, a blade 1318 in the next section can be mounted at 20 degrees, etc. through blade 1310 at the top of the blade assembly 1300. For a given rotational orientation of blade assembly 1300, blades 1322, 1320, 1318, 1316, 1314, 1312, 1310 will be located in different positions relative to a flow of fluid and can capture an impulse from the fluid at different times. If each section has four blades evenly spaced from each other, four different helical patterns can be seen as the blade assembly 1300 rotates.

In some embodiments, the blade sections can be offset in a pattern such that the blade sections fan out in the same direction above and below a particular blade section. The pattern can be similar to the helical shape described above, except that it can consist of two discontinuous helical shapes. For example, a blade 1316 of a central section of the blade assembly 1300 can be mounted in a reference orientation at 0 degrees relative to the central shaft 1308. A blade 1314 in the next higher section can be mounted at 10 degrees. A blade 1312 in the next higher section can be mounted at 20 degrees. A blade 1310 in the next higher section can be mounted at 30 degrees. A blade 1318 in the section directly below blade 1316 can be mounted at 10 degrees. A blade 1320 in the next lower section can be mounted at 20 degrees. A blade 1322 in the next lower section can be mounted at 30 degrees. Fewer or additional blade sections can be included, and the offset angles can vary. In some embodiments, a blade assembly 1300 can have blade sections with adjustable offset angles such that the offset pattern can be varied according to user preferences, fluid flow conditions, or other factors. The offset designs described above with reference to FIG. 13 can be used with the blade assembly 140 described with reference to FIG. 1. The embodiments described in FIGS. 1-12 can also be modular and constructed in separate sections as described with reference to the embodiment shown in FIG. 13.

In some embodiments, fewer or additional concentrators or variable concentrators can be configured for use with the blade assembly. That is, a blade assembly can be used alone, or in combination with one or more of a concentrator or variable concentrator. When used in combination, the different components can enhance the favorable characteristics exhibited by the other, sometimes synergistically. For example, the use of a concentrator with a blade assembly comprising openings or windows towards an inner radial portion of the blades can increase the effect of having a concentrator or having blade openings alone. The turbine system can also include additional blade assemblies, and one or more of the blade assemblies can include lesser or more than four blades. In some embodiments, parameters of the design can be optimized using computer simulation studies such as Cosmos FloWorks and/or ADINA computer modeling. PIV fluid mechanics analysis can also be employed. These tools can be used to increase the efficiency of the design and confirm the desirability of modifications in the quantity, size, shape, and/or placement of the different components of the turbine system. A design similar to that illustrated in FIG. 3B can be estimated to produce about 5 Kilowatts of power in an approximately 28 mile per hour wind. In some embodiments, a theoretical efficiency of over 30 percent can be achieved. The higher the efficiency, the more available power from fluid flow is converted into useable energy, e.g., electrical power. Some embodiments of the vertical-axis fluid turbine system can also be configured not to require uni-directional or laminar fluid flow. The system can also produce a low amount of noise, even at high fluid flow speeds. Birds are less likely to be injured by turbine systems described herein. Many characteristics of embodiments of the fluid turbine systems described herein can make the systems desirable for use as wind turbines in urban environments, where they can also be mounted on pre-existing structures. The systems described herein can therefore be used to exploit wind resources from niches unsuitable for other wind turbines while still producing substantial amounts of power and reducing transmission line losses.

Although the turbine systems described above are described with reference to vertical axis turbines, such systems need not be mounted vertically. Some embodiments can be mounted horizontally or in other orientations with appropriate modifications. Moreover, certain individual features or combinations of features disclosed herein may be adapted for use in horizontal turbines or other types of turbines. In addition, other fluids can be used to rotate the turbines in the above-described systems, including water.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although described in the illustrative context of certain preferred embodiments and examples, it will be understood by those skilled in the art that the disclosure extends beyond the specifically described embodiments to other alternative embodiments and/or uses and obvious modifications and equivalents.

What is claimed is:

1. A fluid turbine system, comprising:
   a turbine comprising blades rotatable about an axis, the blades defining a window along a substantial portion of a height of the blades, wherein each of the blades defines a substantially planar push surface portion that extends outwardly from the window to a curved tip portion, wherein a first plane parallel with and intersecting the axis divides the space surrounding the turbine into a return side and a push side opposite the return side, the turbine configured to rotate generally in an upstream direction on the return side and generally in a downstream direction on the push side relative to a fluid flowing nominally parallel to the plane; and
   a concentrator positionable upstream of at least a portion of the turbine and at least partially or completely on the return side, the concentrator comprising a first curved surface portion configured to extend from a first position upstream of the turbine to a second position further upstream of the turbine and further into the return side, wherein the first curved surface portion is configured to be convex facing an upstream direction of the fluid flow, the first curved surface portion positionable to deflect at least some fluid toward the push side, the concentrator further positionable to create a relative vacuum to draw at least some fluid away from the window of the blades;
   wherein the substantially planar push surface portion of each of the blades is offset in a radial direction from the axis of rotation;
   wherein the curved tip portions are configured such that, when the substantially planar push surface portion of any one of the blades is parallel to the plane, the curved tip portion extends from one side of the plane to the other side of the plane;
   wherein each of the blades further defines a curved rear surface portion that is curved relative to the substantially planar push surface portion.

2. The fluid turbine system of claim 1, wherein the concentrator comprises a second surface portion positionable further into the return side relative to the first curved surface portion, the second surface portion configured to extend from a third position to a fourth position that is further into the return side and further downstream than the third position.

3. The fluid turbine system of claim 2, wherein the concentrator comprises a back surface portion configured to be concave facing downstream, the back surface portion comprising an upstream flow surface portion, an intermediate surface portion, and a downstream flow surface portion, the upstream flow surface portion shaped and positionable to direct at least some fluid flowing upstream from the turbine toward the intermediate surface portion, the intermediate surface portion shaped and positionable to redirect the at least some fluid flowing upstream to flow generally downstream toward the downstream flow surface portion, and the downstream flow surface portion shaped and positionable to receive the at least some fluid from the intermediate surface portion and direct the at least some fluid generally downstream into the fluid flowing nominally parallel to the plane.

4. The fluid turbine system of claim 2, wherein the concentrator is configured to extend in a direction further into the return side at least to an outer edge of the turbine such that the concentrator at least intersects a second plane, the second plane being tangent to an outermost edge of the turbine and parallel to the first plane.

5. The fluid turbine system of claim 4, wherein the second plane is separated from the first plane by a blade tip radius, and wherein the concentrator is configured to extend past the second plane at least twenty-five percent of the blade tip radius.

6. A fluid turbine system, comprising:
a turbine rotatable about an axis, wherein a plane parallel with and intersecting the axis divides the space surrounding the turbine into a return side and a push side opposite the return side, the turbine configured to rotate generally in an upstream direction on the return side and generally in a downstream direction on the push side relative to a fluid flowing nominally parallel to the plane, wherein the turbine comprises a plurality of blades, each of the blades having a substantially straight section extending from the axis of rotation outwardly to a curved tip portion, which curves in a direction opposite the direction of rotation of the turbine, the turbine having a return outer edge furthest away from the push side; and
a concentrator positionable upstream of at least a portion of the turbine and at least partially or completely on the return side, the concentrator comprising a generally u-shaped section, the generally u-shaped section comprising an upstream surface portion positionable to be convex facing upstream and a downstream surface portion positionable to be concave facing downstream, the upstream surface portion positionable to direct a push portion of fluid toward the push side, the upstream surface portion further positionable to direct a return portion of fluid downstream away from the turbine, the downstream surface portion forming a partially enclosed area shaped and positionable to receive a drag portion of fluid from the turbine and redirect the drag portion of fluid downstream into the return portion of fluid, the concentrator having a return end configured to be furthest away from the push side, the return end positionable such that the closest distance between the return end of the concentrator and the plane is at least 1.2 times greater than the closest distance between the return outer edge of the turbine and the plane;
wherein a lush surface of the substantially straight section of each of the blades is offset in a radial direction from the axis of rotation;
wherein the curved tip portions are configured such that, when the substantially straight section of an one of the blades is parallel to the plane, the curved tip portion extends from one side of the plane to the other side of the plane;
wherein each of the blades further defines a curved rear surface portion that is curved relative to the push surface of the substantially straight section.

7. The fluid turbine system of claim 6, wherein the entire concentrator is positionable upstream of the entire turbine.

8. The fluid turbine system of claim 7, wherein the concentrator is shaped substantially as a section of a hollow airfoil.

* * * * *